(12) United States Patent
Yabukami et al.

(10) Patent No.: US 12,398,237 B2
(45) Date of Patent: *Aug. 26, 2025

(54) POLYCARBONATE/POLYORGANOSILOXANE COPOLYMER AND RESIN COMPOSITION INCLUDING SAID COPOLYMER

(71) Applicant: IDEMITSU KOSAN CO.,LTD., Tokyo (JP)

(72) Inventors: Minoru Yabukami, Ichihara (JP); Shinobu Yamao, Ichihara (JP); Takafumi Akimoto, Yotsukaido (JP); Masami Sawai, Funabashi (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 624 days.

This patent is subject to a terminal disclaimer.

(21) Appl. No.: 17/782,606

(22) PCT Filed: Dec. 7, 2020

(86) PCT No.: PCT/JP2020/045440
§ 371 (c)(1),
(2) Date: Jun. 3, 2022

(87) PCT Pub. No.: WO2021/112259
PCT Pub. Date: Jun. 10, 2021

(65) Prior Publication Data
US 2023/0046996 A1    Feb. 16, 2023

(30) Foreign Application Priority Data

Dec. 6, 2019 (JP) .................................. 2019-221749

(51) Int. Cl.
| | | |
|---|---|---|
| *C08G 77/448* | (2006.01) | |
| *C08G 64/18* | (2006.01) | |
| *C08G 77/46* | (2006.01) | |
| *C08J 5/04* | (2006.01) | |
| *C08K 3/04* | (2006.01) | |
| *C08K 7/06* | (2006.01) | |
| *C08K 7/14* | (2006.01) | |

(52) U.S. Cl.
CPC ......... *C08G 64/186* (2013.01); *C08G 77/448* (2013.01); *C08G 77/46* (2013.01); *C08J 5/042* (2013.01); *C08J 5/043* (2013.01); *C08K 3/04* (2013.01); *C08K 7/06* (2013.01); *C08K 7/14* (2013.01)

(58) Field of Classification Search
CPC ............................ C08G 77/448; C08G 64/186
See application file for complete search history.

(56) References Cited

U.S. PATENT DOCUMENTS

| | | | |
|---|---|---|---|
| 5,227,449 A | 7/1993 | Odell et al. | |
| 5,414,054 A * | 5/1995 | Jonsson ............... | C08G 64/186 |
| | | | 525/464 |
| 5,502,134 A * | 3/1996 | Okamoto ............... | C08K 7/14 |
| | | | 524/588 |
| 5,504,177 A | 4/1996 | King, Jr. et al. | |
| 5,783,651 A | 7/1998 | Konig et al. | |
| 5,821,321 A * | 10/1998 | Archey ............... | C08G 77/448 |
| | | | 528/196 |
| 9,828,462 B2 | 11/2017 | Meyer et al. | |
| 9,845,378 B2 | 12/2017 | Meyer et al. | |
| 10,035,884 B2 | 7/2018 | Meyer et al. | |
| 2006/0100413 A1 | 5/2006 | Hong et al. | |
| 2016/0083528 A1 | 3/2016 | Mittal et al. | |
| 2018/0127542 A1 | 5/2018 | Yamada et al. | |
| 2018/0171108 A1 | 6/2018 | Yamada et al. | |
| 2020/0010615 A1 | 1/2020 | Ishikawa et al. | |
| 2021/0009502 A1* | 1/2021 | Santerre ............... | C08G 64/183 |
| 2021/0147685 A1 | 5/2021 | Ishikawa | |
| 2023/0038766 A1* | 2/2023 | Yabukami ............... | C08K 7/06 |
| 2023/0046996 A1 | 2/2023 | Yabukami et al. | |
| 2023/0052441 A1* | 2/2023 | Yabukami ............ | C08G 64/186 |

FOREIGN PATENT DOCUMENTS

| | | |
|---|---|---|
| CN | 106574107 A | 4/2017 |
| CN | 110352210 A | 10/2019 |
| DE | 11 2018 001 080 T5 | 11/2019 |

(Continued)

OTHER PUBLICATIONS

Office Action issued in corresponding European Patent Application No. 20897109.3 dated Sep. 2, 2024 (4 pages).
Office Action issued in corresponding Japanese Patent Application No. 2021-562767 dated Aug. 27, 2024 (10 pages).
European Extended Search Report, dated Aug. 11, 2023, issued in corresponding European Patent Application No. 20897109.3 (9 pages).
Office Action issued in connection with Chinese Appl. No. 202080083822.4 dated Nov. 9, 2023.
European Patent Office, "Communication with Extended Search Report," issued in connection with European Patent Application No. 20191914.9, dated Feb. 5, 2021.

(Continued)

*Primary Examiner* — Marc S Zimmer
(74) *Attorney, Agent, or Firm* — Foley & Lardner LLP

(57) ABSTRACT

Provided is a polycarbonate-polyorganosiloxane copolymer, including: a polyorganosiloxane block (A-1) including a specific structural unit; and a polycarbonate block (A-2) formed of a specific repeating unit, wherein the polycarbonate-polyorganosiloxane copolymer satisfies the following condition (A) or (B): condition (A): a hexane extraction amount of the polycarbonate-polyorganosiloxane copolymer is 150 ppm or less; and condition (B): average weights of polyorganosiloxane blocks in polycarbonate-polyorganosiloxane copolymers obtained by separating the polycarbonate-polyorganosiloxane copolymer with a gel permeation chromatograph satisfy a specific expression.

19 Claims, No Drawings

(56) References Cited

FOREIGN PATENT DOCUMENTS

| | | |
|---|---|---|
| EP | 3 957 673 A1 | 2/2022 |
| JP | H08-311206 A | 11/1996 |
| JP | H09-95536 A | 4/1997 |
| JP | H10-251408 A | 9/1998 |
| JP | 2008-513594 A | 5/2008 |
| JP | 2008-248262 A | 10/2008 |
| JP | 2013-049872 A | 3/2013 |
| JP | 2015-189953 A | 11/2015 |
| JP | 2016-532733 A | 10/2016 |
| JP | 2016-532734 A | 10/2016 |
| JP | 2017-505841 A | 2/2017 |
| JP | 2018-135540 A | 8/2018 |
| JP | 7659503 B2 | 4/2025 |
| KR | 10-2013-0090359 A | 8/2013 |
| WO | WO-91/00885 A1 | 1/1991 |
| WO | WO-2016/016851 A1 | 2/2016 |
| WO | WO-2016/203916 A1 | 12/2016 |
| WO | WO-2019/004200 A1 | 1/2019 |
| WO | WO-2019/124556 A1 | 6/2019 |
| WO | WO-2021/112257 A1 | 6/2021 |
| WO | WO-2021/112260 A1 | 6/2021 |

OTHER PUBLICATIONS

International Searching Authority, "International Search Report," issued in connection with International Patent Application No. PCT/JP2020/045440, dated Feb. 22, 2021.

International Searching Authority, "Written Opinion," issued in connection with International Patent Application No. PCT/JP2020/045440, dated Feb. 22, 2021.

Office Action issued in corresponding Taiwanese Patent Application No. 109143091 dated Jul. 3, 2024 (14 pages).

Office Action issued in corresponding Japanese Patent Application No. 2025-042780 dated Jun. 24, 2025.

* cited by examiner

POLYCARBONATE/POLYORGANOSILOXANE COPOLYMER AND RESIN COMPOSITION INCLUDING SAID COPOLYMER

CROSS-REFERENCE TO RELATED APPLICATIONS

The present application claims priority under 37 U.S.C. § 371 to International Patent Application No. PCT/JP2020/045440, filed Dec. 7, 2020, which claims priority to and the benefit of Japanese Patent Application No. 2019-221749, filed on Dec. 6, 2019. The contents of these applications are hereby incorporated by reference in their entireties.

TECHNICAL FIELD

The present invention relates to a polycarbonate-polyorganosiloxane copolymer and a resin composition including the copolymer.

BACKGROUND ART

A polycarbonate resin is an engineering plastic that is excellent in transparency and dynamic properties, and has extremely high impact resistance. It has been known that a polycarbonate-polyorganosiloxane copolymer obtained by copolymerizing a polycarbonate with a polysiloxane is excellent in low-temperature impact resistance, and is also excellent in chemical resistance while maintaining high transparency.

In general, a method including causing an aromatic dihydroxy compound and phosgene to directly react with each other (interfacial polycondensation method), or a method including subjecting the aromatic dihydroxy compound and a carbonic acid diester in molten states to an ester exchange reaction (melt polymerization method) has been known as a method of producing the polycarbonate resin.

An interfacial polymerization method is frequently adopted for the production of the polycarbonate-polyorganosiloxane copolymer. For example, it has been known that the copolymer can be produced as described below (PTL 1). A diaryl diol compound, such as bisphenol, and phosgene are caused to react with each other in the presence of an organic solvent to produce a polycarbonate oligomer having a reactive chloroformate group. Simultaneously or sequentially with the production of the polycarbonate oligomer, the polycarbonate oligomer, a bisphenol, and a polysiloxane having hydroxyl group-containing aryl groups at both terminals thereof are further brought into contact with each other in a methylene chloride/water medium to produce the copolymer. In general, in a polymerization reaction, a homocoupling body in which the molecules of one and the same raw material component are bonded to each other may be produced, or an unreacted raw material component may be produced because part of the raw materials are not involved in the polymerization reaction. Any such component is present in a polymer to be obtained by the reaction without being uniformly incorporated into the main chain of the polymer, and hence the transparency and dynamic properties of the polymer remarkably reduce. In the interfacial polymerization method, such problem hardly occurs, and hence a polycarbonate-polyorganosiloxane copolymer excellent in transparency and dynamic properties is obtained.

Meanwhile, in the interfacial polymerization method, phosgene having high toxicity needs to be used as a carbonate source. In addition, in a polymerization reaction system, methylene chloride having a large environmental load needs to be used as a solvent, and its removal requires a large degassing apparatus and large energy, thereby leading to an economic disadvantage. To avoid the problem, an investigation has been made on the production of the polycarbonate-polyorganosiloxane copolymer by a production method except the interfacial polymerization method, such as the melt polymerization method.

In PTL 2, there is a disclosure of the production of a polycarbonate-polyorganosiloxane copolymer from a bisphenol compound, a carbonic acid aromatic diester, a silanol-terminated polysiloxane, and a catalyst by the melt polymerization method. In PTL 3, there is a disclosure of a method of producing a block copolysiloxane carbonate in the presence of a carbonate-terminated polyorganosiloxane, a dihydroxy aromatic compound, a diaryl carbonate, and a carbonate ester exchange catalyst. In PTL 4, there is a disclosure of a method of producing a polysiloxane/polycarbonate block co-condensation product, the method including causing a hydroxyaryloxy-terminated dimethylsiloxane, and an oligocarbonate having a specific weight-average molecular weight and a specific terminal ratio (between a OH terminal group and an aryl terminal group), which are in molten states, to react with each other in the presence of a catalyst.

In PTL 5, there is a disclosure of a method of producing a poly(diorganosiloxane)/polycarbonate block copolymer, the method including subjecting a polydiorganosiloxane containing a polydiorganosiloxane component having a specific terminal structure, a Si-free diphenol, and a carbonic acid diaryl ester to melt polymerization in the presence of a specific catalyst. In PTL 6, there is a disclosure of a method of producing a modified polycarbonate resin through solid-phase polymerization, and there is a description of the use of a polysiloxane compound as a starting raw material substance. In each of PTLs 7-9, there is a disclosure of a method of obtaining a polysiloxane-polycarbonate block co-condensation product through an ester exchange method.

CITATION LIST

Patent Literature

PTL 1: JP 2015-189953 A
PTL 2: U.S. Pat. No. 5,227,449 A
PTL 3: JP 08-311206 A
PTL 4: JP 10-251408 A
PTL 5: JP 2008-248262 A
PTL 6: JP 2008-513594 A
PTL 7: JP 2017-505841 A
PTL 8: JP 2016-532734 A
PTL 9: JP 2016-532733 A

SUMMARY OF INVENTION

Technical Problem

In each of PTLs 2-7, there is a disclosure of the method of producing a polycarbonate-polyorganosiloxane copolymer based on the melt polymerization method. However, the method is still insufficient in terms of the production of a polycarbonate-polyorganosiloxane copolymer having good dynamic properties. In PTL 2, the silanol-terminated polysiloxane is used, but it has been known that a silanol-terminated dimethylsiloxane is more liable to cause intramolecular condensation as its molecular weight reduces. A cyclic siloxane produced as a result of the intramolecular condensation remains in the polycarbonate-polyorganosiloxane copolymer to be obtained to adversely affect the dynamic properties of the copolymer. Moreover, concern is raised in that the cyclic siloxane causes an adverse effect, such as a relay contact failure, in applications in electrical and electronic fields.

In PTL 3, there is a description that the amount of a polydimethylsiloxane to be incorporated into the main chain of the polymer increases, but there is a description that the external appearances of the carbonate-terminated polyorganosiloxane and the other raw materials in molten states are "translucent white". Accordingly, it is assumed that the carbonate-terminated polyorganosiloxane is separated from the other raw materials, and hence a component produced by homocoupling and an unreacted carbonate-terminated polyorganosiloxane still remain in the polymer. Those components remarkably reduce the dynamic properties of the polycarbonate-polysiloxane copolymer. In PTL 3, even in a production example in which the amount of the siloxane to be incorporated into the main chain of the polymer is large, an alkali metal-based catalyst (sodium hydroxide) is used in an amount $10 \times 10^{-6}$ times as large as the number of moles of bisphenol A. When an excessive amount of the catalyst is used, an increase in amount of a remaining catalyst component induces the hydrolysis of a polycarbonate chain. Accordingly, it is assumed that the resultant polymer does not have heat resistance or weatherability enough for use under practical conditions. The inventors of the present invention have recognized that the dynamic properties of an allylphenol-terminated polyorganosiloxane copolymer disclosed in PTL 3 also reduce.

In the method disclosed in PTL 4, the oligocarbonate having a specific weight-average molecular weight and a specific terminal ratio (between a OH terminal group and an aryl terminal group) needs to be separately prepared in advance for obtaining the polycarbonate-polysiloxane copolymer. Accordingly, it cannot be said that the method is a practical production method from an economic viewpoint.

The copolymer disclosed in PTL 5 has a large domain structure, and hence it cannot be said that the siloxane is uniformly incorporated into the main chain of the polymer. In PTL 6, there is a description of a method of producing a polycarbonate-polyorganosiloxane copolymer based on a solid-phase reaction. However, there are no references concerning the uniformity of the reaction and the physical properties of the polymer. In PTLs 7-9, the copolymers including polysiloxane blocks having the same structure are produced by the ester exchange method (melt polymerization method). In each of those methods, however, a polycarbonate of a specific structure including a structure in which a carbonyl group is directly bonded to a benzene ring needs to be used as a raw material. The polycarbonate of a specific structure needs to be produced in advance for obtaining a desired polycarbonate-polysiloxane copolymer, thereby leading to an economic disadvantage.

As described in detail, an attempt has been made to obtain a polycarbonate-polyorganosiloxane copolymer through an approach except the interfacial polymerization method, but at present, the introduction of a siloxane block into the main chain of the polymer has been insufficient. An object of the present invention is to obtain, through an approach except the interfacial polymerization method, such a polycarbonate-polyorganosiloxane copolymer that a sufficient amount of a siloxane block can be introduced into the main chain of the polymer, and as a result, high dynamic properties are expressed.

Solution to Problem

The inventors of the present invention have made extensive investigations, and as a result, have found that the production of a polycarbonate-polyorganosiloxane copolymer having a specific structure, the copolymer satisfying a specific condition, provides a polycarbonate-polyorganosiloxane copolymer having high dynamic properties because of introduction of a sufficient amount of a siloxane block into its polymer main chain.

That is, the present invention relates to the following.

[1] A polycarbonate-polyorganosiloxane copolymer, comprising: a polyorganosiloxane block (A-1) including a structural unit represented by the following formula (1); and a polycarbonate block (A-2) formed of a repeating unit represented by the following formula (2), wherein the polycarbonate-polyorganosiloxane copolymer satisfies the following condition (A) or (B):

condition (A): a hexane extraction amount of the polycarbonate-polyorganosiloxane copolymer is 150 ppm by mass or less; and condition (B): average weights of polyorganosiloxane blocks in polycarbonate-polyorganosiloxane copolymers obtained by separating the polycarbonate-polyorganosiloxane copolymer with a gel permeation chromatograph satisfy the following expression (B1):

$$0.3 \leq [\text{POS-Mh}]/[\text{POS-M1}] \leq 3 \quad (B1)$$

wherein in the expression (B1), [POS-Mh] represents an average weight of a polyorganosiloxane block in a polycarbonate-polyorganosiloxane copolymer obtained by fractionating a component corresponding to a retention time range of from T1 to T2 with the gel permeation chromatograph, and [POS-M1] represents an average weight of a polyorganosiloxane block in a polycarbonate-polyorganosiloxane copolymer obtained by fractionating a component corresponding to a retention time range of from T2 to T3 with the gel permeation chromatograph:

T1: a retention time at which a peak top in a gel permeation chromatogram of a standard polystyrene having a ratio Mw/Mn of 1.01 and a Mw of 98,900 is positioned;

T2: a retention time at which a peak top in a gel permeation chromatogram of a standard polystyrene having a ratio Mw/Mn of 1.01 and a Mw of 13,700 is positioned; and T3: a retention time at which a peak top in a gel permeation chromatogram of a standard polystyrene having a ratio Mw/Mn of 1.03 and a Mw of 3,120 is positioned:

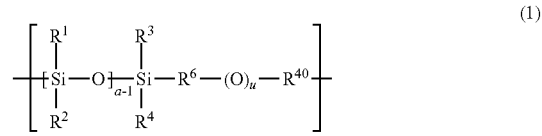

wherein $R^1$ to $R^4$ may be identical to or different from each other, and each independently represent a hydrogen atom, a halogen atom, an alkyl group having 1 to 10 carbon atoms, an alkoxy group having 1 to 10 carbon atoms, an aryl group having 6 to 12 carbon atoms, or an alkylaryl group whose alkyl group moiety has 1 to 10 carbon atoms, $R^6$ represents an arylene group having 6 to 20 carbon atoms, an alkylene group having 1 to 10 carbon atoms, or an alkylarylene group whose alkyl group moiety has 1 to 10 carbon atoms, and may contain, as a functional group, —O—, —COO—, —CO—, —S—, —NH—, or —NR$^{111}$—, $R^{111}$ represents an alkyl group having 1 to 10 carbon atoms or an aryl group having 6 to 10 carbon atoms, $R^{40}$ represents a divalent aliphatic hydrocarbon group having 3 to 400 carbon atoms or a divalent alicyclic hydrocarbon group having 3 to 400 carbon atoms, or a divalent aromatic hydrocarbon group having 8 to 400 carbon atoms, and may be substituted with a substituent, the divalent aliphatic hydrocarbon group, the divalent alicyclic hydrocarbon group, or the divalent aromatic hydrocarbon group may contain at least one heteroatom selected from an oxygen atom, a nitrogen atom, and a sulfur atom, or at least one halogen atom selected from a fluorine atom, a chlorine atom, a bromine atom, and an iodine atom, "a" represents an integer of from 2 to 500, "u" represents 0 or 1, $R^{10}$ represents a divalent aliphatic hydrocarbon group having 2 to 40 carbon atoms or a divalent alicyclic hydrocarbon group having 3 to 40 carbon atoms, or a divalent aromatic hydrocarbon group having 6 to 20 carbon atoms, and may be substituted with a substituent, the divalent aliphatic hydrocarbon group, the divalent alicyclic hydrocarbon group, or the divalent aromatic hydrocarbon group may contain at least one heteroatom selected from an oxygen atom, a nitrogen atom, and a sulfur atom, or at least one halogen atom selected from a fluorine atom, a chlorine atom, a bromine atom, and an iodine atom, and "y" represents an integer of from 10 to 500.

[2] The polycarbonate-polyorganosiloxane copolymer according to the above-mentioned item [1], wherein the polyorganosiloxane block (A-1) has a structure represented by the following formula (1'):

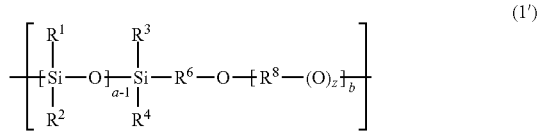

wherein $R^1$ to $R^4$, $R^6$, and "a" are as described above, a plurality of $R^8$s may be identical to or different from each other, and each independently represent an arylene group having 6 to 20 carbon atoms, an alkylene group having 2 to 10 carbon atoms, a branched alkylene group having 3 to 10 carbon atoms, or an alkylarylene group whose alkyl group moiety has 1 to 10 carbon atoms, and may each contain, as a functional group, —O—, —COO—, —CO—, —S—, —NH—, or —NR$^{111}$—, —R$^{111}$ represents an alkyl group having 1 to 10 carbon atoms or an aryl group having 6 to 10 carbon atoms, "z" represents 0 or 1, and "b" represents an integer of from 2 to 200.

[3] The polycarbonate-polyorganosiloxane copolymer according to the above-mentioned item [1] or [2], wherein the polycarbonate block (A-2) has a structure represented by the following formula (111) and a structure represented by the following formula (112):

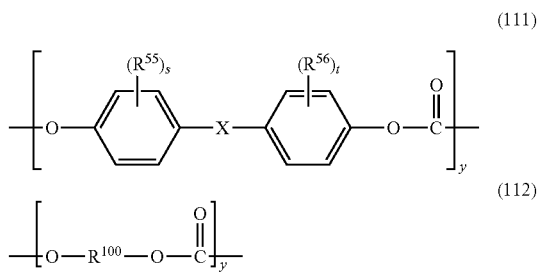

where $R^{55}$ and $R^{56}$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^{100}$ represents a divalent aliphatic hydrocarbon group having 2 to 40 carbon atoms, and may include a branched structure or a cyclic structure, and $R^{100}$ may contain at least one heteroatom selected from an oxygen atom, a nitrogen atom, and a sulfur atom, or at least one halogen atom selected from a fluorine atom, a chlorine atom, a bromine atom, and an iodine atom, "y" represents an integer of from 10 to 500, and "s" and "t" each independently represent an integer of from 0 to 4.

[4] The polycarbonate-polyorganosiloxane copolymer according to any one of the above-mentioned items [1] to [3], wherein the polycarbonate block (A-2) includes a structural unit derived from an aromatic bisphenol selected from the group consisting of 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3-methylcyclohexane, 1,1-bis(4-hydroxyphenyl)-3,3,5-trimethylcyclohexane, and 1,1-bis(4-hydroxyphenyl)cyclododecene, or a structural unit derived from an aliphatic diol selected from the group consisting of isosorbide, cyclohexane-1,4-dimethanol, tricyclodecanedimethanol, 3,9-bis(1,1-dimethyl-2-hydroxyethyl)-2,4,8,10-tetraoxaspiro[5.5]undecane, 1,3-propanediol, and 1,4-butanediol.

[5] The polycarbonate-polyorganosiloxane copolymer according to any one of the above-mentioned items [1] to [4], wherein the polycarbonate block (A-2) includes one or more selected from the group consisting of repeating units represented by the following formulae (a-i) to (a-v).

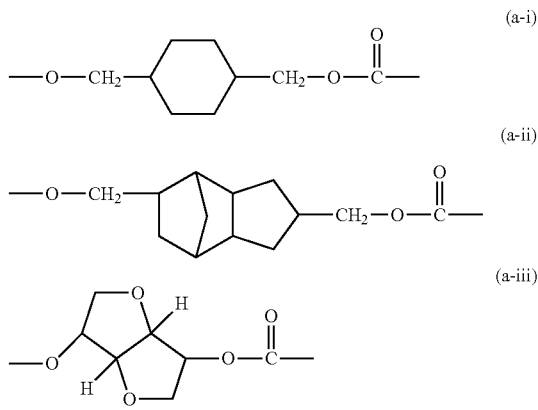

-continued

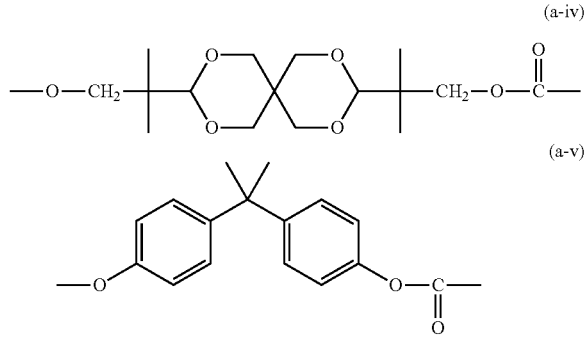

[6] The polycarbonate-polyorganosiloxane copolymer according to any one of the above-mentioned items [1] to [5], wherein in the formula (1), "a" represents an integer of 2 or more and 300 or less.

[7] The polycarbonate-polyorganosiloxane copolymer according to any one of the above-mentioned items [1] to [6], wherein the polyorganosiloxane block (A-1) includes at least one selected from the group consisting of structural units represented by the following formulae (1-1) to (1-3):

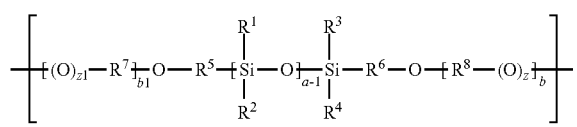

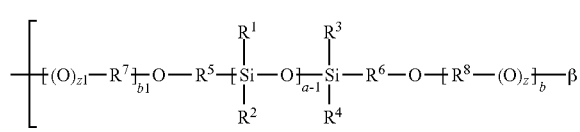

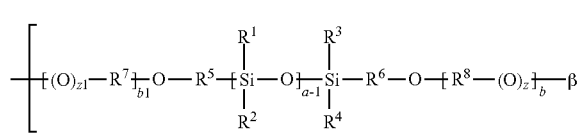

wherein $R^1$ to $R^4$, $R^6$, $R^8$, "z", "a", and "b" are as described above, $R^5$ represents an arylene group having 6 to 20 carbon atoms, an alkylene group having 1 to 10 carbon atoms, or an alkylarylene group whose alkyl group moiety has 1 to 10 carbon atoms, and may contain, as a functional group, —O—, —COO—, —CO—, —S—, —NH—, or —$NR^{111}$—, $R^7$ represents an arylene group having 6 to 20 carbon atoms, an alkylene group having 2 to 10 carbon atoms, a branched alkylene group having 3 to 10 carbon atoms, or an alkylarylene group whose alkyl group moiety has 1 to 10 carbon atoms, and may contain, as a functional group, —O—, —COO—, —CO—, —S—, —NH—, or —$NR^{111}$—, $R^{111}$ represents an alkyl group having 1 to 10 carbon atoms or an aryl group having 6 to 10 carbon atoms, "z1" represents 0 or 1, "b1" represents an integer of from 2 to 200, and β represents a divalent group derived from a diisocyanate compound, or a divalent group derived from a dicarboxylic acid or a dicarboxylic acid halide.

[8] The polycarbonate-polyorganosiloxane copolymer according to any one of the above-mentioned items [1] to [7], wherein in the formula (1), $R^1$ to $R^4$ each represent a methyl group.

[9] The polycarbonate-polyorganosiloxane copolymer according to any one of the above-mentioned items [1] to [8], wherein in the formula (1), $R^6$ represents a trimethylene group (—$(CH_2)_3$—).

[10] The polycarbonate-polyorganosiloxane copolymer according to any one of the above-mentioned items [2] to [9], wherein in the formula (1'), $R^8$ represents any structure selected from the group consisting of a dimethylene group (—$(CH_2)_2$—), a methyl-substituted dimethylene group (—$CH_2CHMe$-), a trimethylene group (—$(CH_2)_3$—), and a tetramethylene group (—$(CH_2)_4$—).

[11] The polycarbonate-polyorganosiloxane copolymer according to any one of the above-mentioned items [1] to [10], wherein a content of the polyorganosiloxane block represented by the formula (1) in the polycarbonate-polyorganosiloxane copolymer is 0.1 mass % or more and 60 mass % or less.

[12] The polycarbonate-polyorganosiloxane copolymer according to any one of the above-mentioned items [1] to [11], wherein the polycarbonate-polyorganosiloxane copolymer has a viscosity-average molecular weight (Mv) of 5,000 or more and 50,000 or less.

[13] The polycarbonate-polyorganosiloxane copolymer according to any one of the above-mentioned items [1] to [12], wherein a 1-millimeter thick plate obtained by molding the polycarbonate-polyorganosiloxane copolymer has a haze value of 40 or less measured in conformity with ISO 14782:1999.

[14] The polycarbonate-polyorganosiloxane copolymer according to any one of the above-mentioned items [1] to [13], wherein the polycarbonate-polyorganosiloxane copolymer is obtained by a melt polymerization method.

[15] The polycarbonate-polyorganosiloxane copolymer according to any one of the above-mentioned items [1] to [14], wherein the polycarbonate-polyorganosiloxane copolymer is obtained by using a diol monomer (a1).

[16] A polycarbonate-based resin composition, comprising the polycarbonate-polyorganosiloxane copolymer of any one of the above-mentioned items [1] to [15].

[17] The polycarbonate-based resin composition according to the above-mentioned item [16], further comprising an inorganic filler.

[18] The polycarbonate-based resin composition according to the above-mentioned item [17], wherein the polycarbonate-based resin composition comprises 1 part by mass to 150 parts by mass of the inorganic filler with respect to 100 parts by mass of the polycarbonate-polyorganosiloxane copolymer.

[19] The polycarbonate-based resin composition according to the above-mentioned item [17] or [18], wherein the inorganic filler is a glass fiber or a carbon fiber.

[20] A molded body, comprising the polycarbonate-based resin composition of any one of the above-mentioned items [16] to [19].

Advantageous Effects of Invention

According to the present invention, a sufficient amount of the siloxane block can be introduced into the main chain of the polymer, and hence the polycarbonate-polyorganosiloxane copolymer having excellent dynamic properties can be obtained.

DESCRIPTION OF EMBODIMENTS

A polycarbonate-polyorganosiloxane copolymer and a polycarbonate-based resin composition including the copolymer of the present invention are described in detail below. Herein, a specification considered to be preferred may be arbitrarily adopted, and a combination of preferred specifications can be said to be more preferred. The term "XX to YY" as used herein means "XX or more and YY or less."

<Polycarbonate-Polyorganosiloxane Copolymer>

A polycarbonate-polyorganosiloxane copolymer of the present invention is characterized in that the copolymer includes a polyorganosiloxane block (A-1) including a structural unit represented by the following formula (1) and a polycarbonate block (A-2) formed of a repeating unit represented by the following formula (2), and satisfies the following condition (A) or (B):

condition (A): a hexane-extracted component amount of the polycarbonate-polyorganosiloxane copolymer is 150 ppm by mass or less; and condition (B): average weights of polyorganosiloxane blocks in polycarbonate-polyorganosiloxane copolymers obtained by separating the polycarbonate-polyorganosiloxane copolymer with a gel permeation chromatograph satisfy the following expression (B1):

$$0.3 \leq [\text{POS-Mh}]/[\text{POS-M1}] \leq 3 \quad (B1)$$

wherein in the expression (B1), [POS-Mh] represents an average weight of a polyorganosiloxane block in a polycarbonate-polyorganosiloxane copolymer obtained by fractionating a component corresponding to a retention time range of from T1 to T2 with the gel permeation chromatograph, and [POS-M1] represents an average weight of a polyorganosiloxane block in a polycarbonate-polyorganosiloxane copolymer obtained by fractionating a component corresponding to a retention time range of from T2 to T3 with the gel permeation chromatograph:

T1: a retention time at which a peak top in a gel permeation chromatogram of a standard polystyrene having a ratio Mw/Mn of 1.01 and a Mw of 98,900 is positioned;

T2: a retention time at which a peak top in a gel permeation chromatogram of a standard polystyrene having a ratio Mw/Mn of 1.01 and a Mw of 13,700 is positioned; and T3: a retention time at which a peak top in a gel permeation chromatogram of a standard polystyrene having a ratio Mw/Mn of 1.03 and a Mw of 3,120 is positioned:

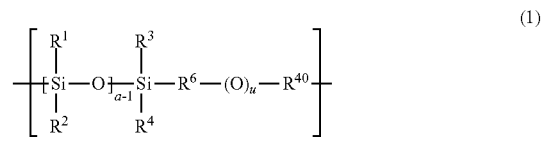

wherein $R^1$ to $R^4$ may be identical to or different from each other, and each independently represent a hydrogen atom, a halogen atom, an alkyl group having 1 to 10 carbon atoms, an alkoxy group having 1 to 10 carbon atoms, an aryl group having 6 to 12 carbon atoms, or an alkylaryl group whose alkyl group moiety has 1 to 10 carbon atoms, $R^6$ represents an arylene group having 6 to 20 carbon atoms, an alkylene group having 1 to 10 carbon atoms, or an alkylarylene group whose alkyl group moiety has 1 to 10 carbon atoms, and may contain, as a functional group, —O—, —COO—, —CO—, —S—, —NH—, or —NR$^{111}$—, $R^{111}$ represents an alkyl group having 1 to 10 carbon atoms or an aryl group having 6 to 10 carbon atoms, $R^{40}$ represents a divalent aliphatic hydrocarbon group having 3 to 400 carbon atoms or a divalent alicyclic hydrocarbon group having 3 to 400 carbon atoms, or a divalent aromatic hydrocarbon group having 8 to 400 carbon atoms, and may be substituted with a substituent, the divalent aliphatic hydrocarbon group, the divalent alicyclic hydrocarbon group, or the divalent aromatic hydrocarbon group may contain at least one heteroatom selected from an oxygen atom, a nitrogen atom, and a sulfur atom, or at least one halogen atom selected from a fluorine atom, a chlorine atom, a bromine atom, and an iodine atom, "a" represents an integer of from 2 to 500, "u" represents 0 or 1, $R^{10}$ represents a divalent aliphatic hydrocarbon group having 2 to 40 carbon atoms or a divalent alicyclic hydrocarbon group having 3 to 40 carbon atoms, or a divalent aromatic hydrocarbon group having 6 to 20 carbon atoms, and may be substituted with a substituent, the divalent aliphatic hydrocarbon group, the divalent alicyclic hydrocarbon group, or the divalent aromatic hydrocarbon group may contain at least one heteroatom selected from an oxygen atom, a nitrogen atom, and a sulfur atom, or at least one halogen atom selected from a fluorine atom, a chlorine atom, a bromine atom, and an iodine atom, and "y" represents an integer of from 10 to 500.

When $R^6$ represents an alkylene group, its number of carbon atoms is preferably from 1 to 5.

From the viewpoint of improving the affinity of the polyorganosiloxane block for a diol monomer (a1) to perform uniform polymerization, the block preferably includes, as $R^{40}$, a repeating chain structure in which at least two structures each containing at least one hydrocarbon group selected from a divalent aliphatic hydrocarbon group having 2 to 20 carbon atoms, a divalent alicyclic hydrocarbon group having 3 to 20 carbon atoms, and a divalent aromatic hydrocarbon group having 6 to 20 carbon atoms, and each containing at least one heteroatom selected from the group consisting of an oxygen atom, a nitrogen atom, and a sulfur atom are linked to each other. The structure containing at least one hydrocarbon group selected from a divalent aliphatic hydrocarbon group having 2 to 20 carbon atoms, a divalent alicyclic hydrocarbon group having 3 to 20 carbon atoms, and a divalent aromatic hydrocarbon group having 6 to 20 carbon atoms, and containing at least one heteroatom selected from the group consisting of an oxygen atom, a nitrogen atom, and a sulfur atom is preferably a structure containing at least one structure selected from the group consisting of —OH, —O—, —(C=O)—, —O(C=O)—, —O(C=O)O—, —NH$_2$, —NRH, —NR—, —NR—(C=O)—, —N=CR—, —SH, —S—, —S—S—, and —(S=O)—. R represents a hydrogen atom, a monovalent aliphatic hydrocarbon group having 1 to 20 carbon atoms, or a monovalent aromatic hydrocarbon group having 6 to 20 carbon atoms, and the hydrocarbon groups may each be substituted with a substituent. Preferred examples of the repeating chain structure may include the following structures: polyether, polyacetal, polylactone, polyacrylate, polyester, polycarbonate, polyketone, polysulfide, poly sulfone, polyamide, and polyimide.

Among them, at least one selected from the group consisting of polyether, polyacrylate, and polycarbonate is preferred, and polyether is most preferred. As the polyether, a polyalkylene ether is preferred. Among them, polyethylene glycol, polypropylene glycol, polytrimethylene glycol, and polytetramethylene glycol are preferred.

As described above, the polycarbonate-polyorganosiloxane copolymer of the present invention includes the polyorganosiloxane block (A-1) including the structural unit represented by the formula (1) and the polycarbonate block (A-2) formed of the repeating unit represented by the formula (2).

When the polyorganosiloxane block for forming the polycarbonate-polyorganosiloxane copolymer includes the structural unit represented by the formula (1), and the specific condition (A) or (B) is satisfied, a sufficient amount of the siloxane block can be introduced into the main chain of the polycarbonate-polyorganosiloxane copolymer to be obtained. Further, higher transparency can be obtained through the selection of $R^6$, $R^{40}$, and "a" in the formula (1), and/or the selection of 10° in the formula of the polycarbonate block (A-2) formed of the repeating unit represented by the formula (2).

As described later, the polycarbonate-polyorganosiloxane copolymer of the present invention may be obtained by a melt polymerization method. The melt polymerization method is environmentally and economically advantageous because the method does not require a solvent such as methylene chloride. In addition, the method is advantageous in terms of production because phosgene having high toxicity is not used as a carbonate source.

The polyorganosiloxane block (A-1) including the structural unit represented by the formula (1) preferably has a structure represented by the following formula (1A):

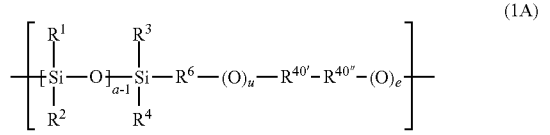

wherein
in the formula (1A), $R^1$ to $R^4$, $R^6$, "a", and "u" are as described above,
$R^{40'}$ represents a divalent aliphatic hydrocarbon group having 2 to 380 carbon atoms, a divalent alicyclic hydrocarbon group having 3 to 380 carbon atoms, or a divalent aromatic hydrocarbon group having 6 to 380 carbon atoms, and may be substituted with a substituent, the divalent aliphatic hydrocarbon group, the divalent alicyclic hydrocarbon group, or the divalent aromatic hydrocarbon group may contain at least one heteroatom selected from an oxygen atom, a nitrogen atom, and a sulfur atom, or at least one halogen atom selected from a fluorine atom, a chlorine atom, a bromine atom, and an iodine atom, $R^{40''}$ represents a divalent aliphatic hydrocarbon group having 1 to 20 carbon atoms, a divalent alicyclic hydrocarbon group having 3 to 20 carbon atoms, or a divalent aromatic hydrocarbon group having 6 to 20 carbon atoms, and may be substituted with a substituent, and "e" each represents 0 or 1.

The polyorganosiloxane preferably includes, as $R^{40'}$, a repeating chain structure in which at least two structures each containing at least one hydrocarbon group selected from a divalent aliphatic hydrocarbon group having 1 to 20 carbon atoms, a divalent alicyclic hydrocarbon group having 3 to 20 carbon atoms, and a divalent aromatic hydrocarbon group having 6 to 20 carbon atoms, and each containing at least one heteroatom selected from the group consisting of an oxygen atom, a nitrogen atom, and a sulfur atom are linked to each other. The structure containing at least one hydrocarbon group selected from a divalent aliphatic hydrocarbon group having 1 to 20 carbon atoms, a divalent alicyclic hydrocarbon group having 3 to 20 carbon atoms, and a divalent aromatic hydrocarbon group having 6 to 20 carbon atoms, and containing at least one heteroatom selected from the group consisting of an oxygen atom, a nitrogen atom, and a sulfur atom is preferably a structure containing at least one structure selected from the group consisting of —OH, —O—, —(C=O)—, —O(C=O)—, —O(C=O)O—, —NH$_2$, —NRH, —NR—, —NR—(C=O)—, —N=CR—, —SH, —S—, —S—S—, and —(S=O)—. R represents a hydrogen atom, a monovalent aliphatic hydrocarbon group having 1 to 20 carbon atoms, or a monovalent aromatic hydrocarbon group having 6 to 20 carbon atoms, and the hydrocarbon groups may each be substituted with a substituent. Preferred examples of the repeating chain structure may include the following structures: polyether, polyacetal, polylactone, polyacrylate, polyester, polycarbonate, polyketone, polysulfide, polysulfone, polyamide, and polyimide.

Among them, at least one selected from the group consisting of polyether, polyacrylate, and polycarbonate is preferred, and polyether is most preferred. As the polyether, a polyalkylene ether is preferred. Among them, polyethylene glycol, polypropylene glycol, polytrimethylene glycol, and polytetramethylene glycol are preferred. The above-mentioned structures are preferred from the viewpoint of improving the affinity of the polyorganosiloxane for the diol monomer (a1) to perform uniform polymerization.

The polyorganosiloxane block (A-1) including the structural unit represented by the formula (1) more preferably has a structure represented by the following formula (1'):

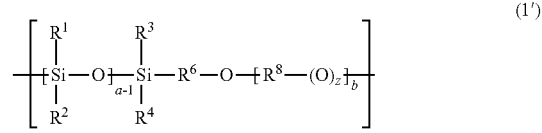

wherein $R^1$ to $R^4$, $R^6$, and "a" are as described above, a plurality of $R^8$s may be identical to or different from each other, and each independently represent an arylene group having 6 to 20 carbon atoms, an alkylene group having 2 to 10 carbon atoms, a branched alkylene group having 3 to 10 carbon atoms, or an alkylarylene group whose alkyl group moiety has 1 to 10 carbon atoms, and may each contain, as a functional group, —O—, —COO—, —CO—, —S—, —NH—, or —NR$^{111}$—, R$^{111}$ represents an alkyl group having 1 to 10 carbon atoms or an aryl group having 6 to 10 carbon atoms, "z" represents 0 or 1, and "b" represents an integer of from 2 to 200.

Preferred examples of R$^8$ are described later.

The polyorganosiloxane block (A-1) including the structural unit represented by the formula (1) preferably includes at least one selected from the group consisting of structural units represented by the following formulae (1-1) to (1-3):

whose alkyl group moieties are the above-mentioned alkyl groups and whose aryl group moieties are the above-mentioned aryl groups.

R$^1$ to R$^4$ each preferably represent a hydrogen atom, an alkyl group having 1 to 6 carbon atoms, an alkoxy group having 1 to 6 carbon atoms, an aryl group having 6 to 12 carbon atoms, or an alkylaryl group having 1 to 10 carbon atoms, and each more preferably represent a methyl group.

Examples of the arylene group having 6 to 20 carbon atoms that is represented by R$^6$ in the formula (1), (1A), or (1'), or any one of R$^5$ and R$^6$ in the formulae (1-1) to (1-3) include a phenylene group and a naphthylene group. Examples of the alkylene group having 1 to 10 carbon atoms

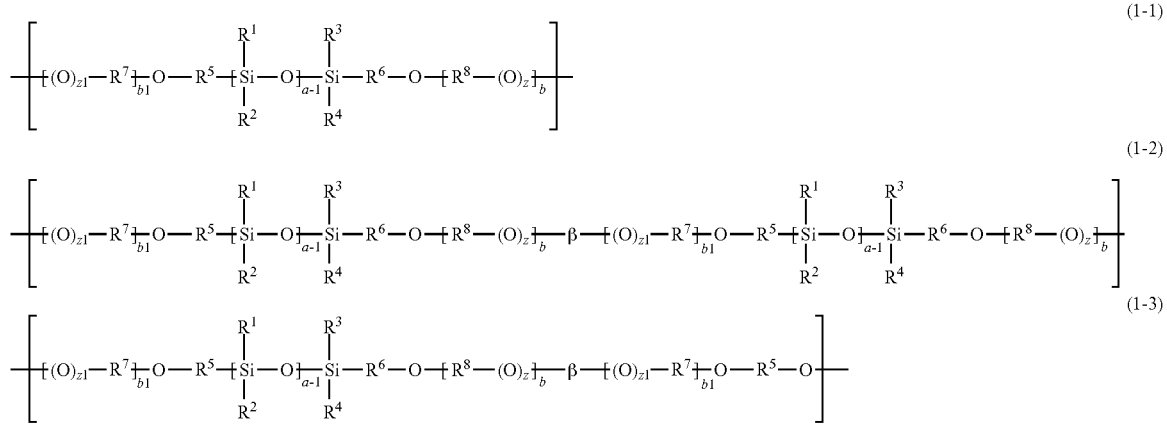

wherein R$^1$ to R$^4$, R$^6$, R$^8$, "z", "a", and "b" are as described above, R$^5$ represents an arylene group having 6 to 20 carbon atoms, an alkylene group having 1 to 10 carbon atoms, or an alkylarylene group whose alkyl group moiety has 1 to 10 carbon atoms, and may contain, as a functional group, —O—, —COO—, —CO—, —S—, —NH—, or —NR$^{111}$—, R$^7$ represents an arylene group having 6 to 20 carbon atoms, an alkylene group having 2 to 10 carbon atoms, a branched alkylene group having 3 to 10 carbon atoms, or an alkylarylene group whose alkyl group moiety has 1 to 10 carbon atoms, and may contain, as a functional group, —O—, —COO—, —CO—, —S—, —NH—, or —NR$^{111}$—, R$^{111}$ represents an alkyl group having 1 to 10 carbon atoms or an aryl group having 6 to 10 carbon atoms, "z1" represents 0 or 1, "b1" represents an integer of from 2 to 200, and β represents a divalent group derived from a diisocyanate compound, or a divalent group derived from a dicarboxylic acid or a dicarboxylic acid halide.

When R$^5$ represents an alkylene group, its number of carbon atoms is preferably from 1 to 5.

Examples of the halogen atom represented by any one of R$^1$ to R$^4$ in the formulae include a fluorine atom, a chlorine atom, a bromine atom, and an iodine atom. Examples of the alkyl group having 1 to 10 carbon atoms that is represented by any one of R$^1$ to R$^4$ include a methyl group, an ethyl group, a n-propyl group, an isopropyl group, various butyl groups, various pentyl groups, and various hexyl groups. Examples of the alkoxy group represented by any one of R$^1$ to R$^4$ include alkoxy groups whose alkyl group moieties are the above-mentioned alkyl groups. Examples of the aryl group represented by any one of R$^1$ to R$^4$ include a phenyl group and a naphthyl group. Examples of the alkylaryl group represented by any one of R$^1$ to R$^4$ include alkylaryl groups that is represented by R$^6$ in the formula (1), (1A), or (1'), or any one of R$^5$ and R$^6$ in the formulae (1-1) to (1-3) include a methylene group, a dimethylene group, a trimethylene group, a methyl-substituted dimethylene group, and a tetramethylene group (the tetramethylene group may have a branched structure). Examples of the alkylarylene group represented by R$^6$ in the formula (1), (1A), or (1'), or any one of R$^5$ and R$^6$ in the formulae (1-1) to (1-3) include alkylarylene groups whose alkyl group moieties are the above-mentioned alkyl groups and whose arylene group moieties are the above-mentioned arylene groups.

R$^6$ in the formula (1), (1A), or (1'), or each of R$^5$ and R$^6$ in the formulae (1-1) to (1-3) preferably represents an alkylene group having 1 to 10 carbon atoms, and more preferably represents a dimethylene group, a methyl-substituted dimethylene group, or a trimethylene group. It is particularly preferred that R$^6$ in each of the formulae represent a trimethylene group (—(CH$_2$)$_3$—).

Examples of the arylene group having 6 to 20 carbon atoms that is represented by R$^8$ in the formula (1'), or any one of R$^7$ and R$^8$ in the formulae (1-1) to (1-3) include a phenylene group and a naphthylene group. Examples of the alkylene group having 2 to 10 carbon atoms that is represented by R$^8$ in the formula (1'), or any one of R$^7$ and R$^8$ in the formulae (1-1) to (1-3) include a methylene group, a dimethylene group, a trimethylene group, a methyl-substituted dimethylene group, and a tetramethylene group (the tetramethylene group may have a branched structure). Examples of the alkylarylene group represented by R$^8$ in the formula (1'), or any one of R$^7$ and R$^8$ in the formulae (1-1) to (1-3) include alkylarylene groups whose alkyl group moieties are the above-mentioned alkyl groups and whose arylene group moieties are the above-mentioned arylene groups.

$R^8$ in the formula (1'), or each of $R^7$ and $R^8$ in the formulae (1-1) to (1-3) preferably represents an alkylene group having 1 to 10 carbon atoms, and more preferably represents any structure selected from the group consisting of a dimethylene group (—$(CH_2)_2$—), a methyl-substituted dimethylene group (—$CH_2CHMe$-), a trimethylene group (—$(CH_2)_3$—), and a tetramethylene group (—$(CH_2)_4$—). The above-mentioned structures are preferred from the viewpoint of improving the affinity of the polyorganosiloxane for the diol monomer (a1) to perform uniform polymerization.

Such a polyorganosiloxane as described below is particularly preferred: $R^1$ to $R^4$ in the formula (1), (1A), or (1'), or the formulae (1-1) to (1-3) each represent a methyl group; $R^6$ in the formula (1), (1A), or (1'), or each of $R^5$ and $R^6$ in the formulae (1-1) to (1-3) represents a trimethylene group; and $R^8$ in the formula (1'), or each of $R^7$ and $R^8$ in the formulae (1-1) to (1-3) represents a dimethylene group.

β in each of the formulae (1-1) and (1-2) represents a divalent group derived from a diisocyanate compound, or a divalent group derived from a dicarboxylic acid or a dicarboxylic acid halide, and examples thereof include divalent groups represented by the following formulae (iii) to (vii):

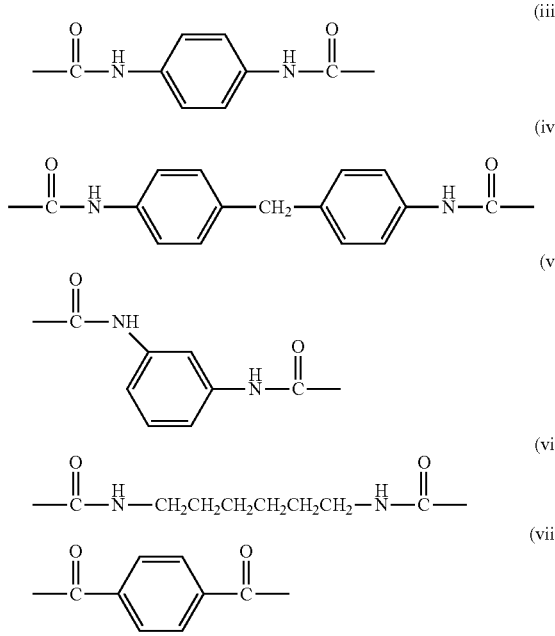

wherein
in the formula (1), (1A), or (1'), or the formulae (1-1) to (1-3), "a" represents the chain length of the polyorganosiloxane, and represents an integer of 2 or more and 500 or less, preferably 2 or more and 300 or less, more preferably 10 or more and 120 or less, still more preferably 15 or more and 100 or less, still more preferably 20 or more and 90 or less. "a" preferably falls within the ranges because a polycarbonate-polyorganosiloxane copolymer having excellent dynamic properties can be obtained. "a" more preferably represents an integer of, for example, 20 or more and 65 or less because the copolymer has excellent transparency in addition to the excellent dynamic properties.

In the formula (1') or the formulae (1-1) to (1-3), "b" and "b1" each independently represent an integer of preferably 0 or more and 200 or less, more preferably 2 or more and 100 or less, still more preferably 5 or more and 50 or less, still more preferably 8 or more and 25 or less. "b" and "b1" preferably fall within the ranges because of the ease of availability of a raw material for the polyorganosiloxane. "b" and "b1" each more preferably represent 100 or less because a reduction in handleability of the polyorganosiloxane due to an increase in viscosity or melting point thereof can be suppressed, and "b" and "b1" each still more preferably represent 50 or less because the content of the polyorganosiloxane block in the resin can be kept at such an amount that a physical property-improving effect can be maintained.

In the formula (1') or the formulae (1-1) to (1-3), "z" and "z1" each independently represent 0 or 1, preferably 0.

The polycarbonate-polyorganosiloxane copolymer of the present invention includes the polycarbonate block (A-2) formed of the repeating unit represented by the formula (2).

Examples of the divalent aliphatic hydrocarbon group having 2 to 40 carbon atoms that is represented by $R^{10}$ in the formula (2) include an ethylene group, a n-propylene group, an isopropylene group, a n-butylene group, an isobutylene group, a n-pentylene group, a n-hexylene group, a n-heptylene group, a n-octylene group, a 2-ethylhexylene group, a n-nonylene group, a n-decylene group, a n-undecylene group, a n-dodecylene group, a n-tridecylene group, a n-tetradecylene group, a n-pentadecylene group, a n-hexadecylene group, a n-heptadecylene group, and a n-octadecylene group. Examples of the alicyclic hydrocarbon group having 3 to 40 carbon atoms that is represented by $R^{10}$ in the formula (2) include a cyclopentylene group, a cyclohexylene group, a cyclooctylene group, a cyclodecylene group, a cyclotetradecylene group, an adamantylene group, a bicycloheptylene group, a bicyclodecylene group, and a tricyclodecylene group.

Examples of the divalent aromatic hydrocarbon group having 6 to 20 carbon atoms that is represented by $R^{10}$ in the formula (2) may include various groups. In particular, the examples may include divalent aromatic hydrocarbon groups derived from 2,2-bis(4-hydroxyphenyl)propane (bisphenol A), 2,2-bis(4-hydroxy-3-methylphenyl)propane (bisphenol C), 1,1-bis(4-hydroxyphenyl)cyclohexane (bisphenol Z), 1,1-bis(4-hydroxyphenyl)-3-methylcyclohexane (bisphenol 3MZ), 1,1-bis(4-hydroxyphenyl)-3,3,5-trimethylcyclohexane (bisphenol HTG), and 1,1-bis(4-hydroxyphenyl)cyclododecene. In addition to the foregoing, the examples may also include divalent aromatic hydrocarbon groups each derived from at least one kind selected from the group consisting of hydroquinone, resorcin, and catechol.

The polycarbonate block (A-2) having the structure represented by the formula (2) preferably has a structure represented by the following formula (111) and a structure represented by the following formula (112):

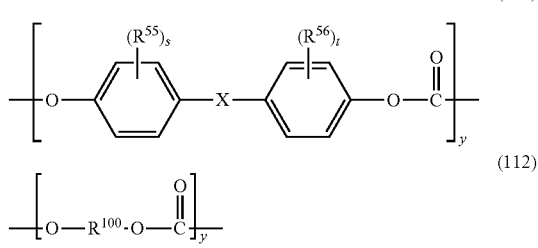

wherein $R^{55}$ and $R^{56}$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^{100}$ represents a divalent aliphatic hydrocarbon group having 2 to 40 carbon atoms, and may include a branched structure or a cyclic structure, and $R^{100}$ may contain at least one heteroatom selected from an oxygen atom, a nitrogen atom, and a sulfur atom, or at least one halogen atom selected from a fluorine atom, a chlorine atom, a bromine atom, and an iodine atom, "y" represents an integer of from 10 to 500, and "s" and "t" each independently represent an integer of from 0 to 4.

Examples of the halogen atom that $R^{55}$ and $R^{56}$ in the formula (111) each independently represent include a fluorine atom, a chlorine atom, a bromine atom, and an iodine atom.

Examples of the alkyl group that $R^{55}$ and $R^{56}$ each independently represent include a methyl group, an ethyl group, a n-propyl group, an isopropyl group, various butyl groups (the term "various" means that a linear group and various branched groups are included, and the same applies to the following), various pentyl groups, and various hexyl groups. Examples of the alkoxy group that $R^{55}$ and $R^{56}$ each independently represent include alkoxy groups whose alkyl group moieties are the above-mentioned alkyl groups.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the arylene group represented by X include a phenylene group, a naphthylene group, and a biphenylene group. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred. Examples of the aryl moiety of the arylalkylene group represented by X include aryl groups each having 6 to 14 ring-forming carbon atoms, such as a phenyl group, a naphthyl group, a biphenyl group, and an anthryl group. Examples of the aryl moiety of the arylalkylidene group represented by X include aryl groups each having 6 to 14 ring-forming carbon atoms, such as a phenyl group, a naphthyl group, a biphenyl group, and an anthryl group.

"s" and "t" each independently represent an integer of from 0 to 4, preferably from 0 to 2, more preferably 0 or 1. Among them, a compound in which "s" and "t" each represent 0, and X represents a single bond or an alkylene group having 1 to 8 carbon atoms, or a compound in which "s" and "t" each represent 0, and X represents an alkylidene group, in particular, an isopropylidene group is suitable.

The divalent aliphatic hydrocarbon group having 2 to 40 carbon atoms that is represented by $R^{100}$ is specifically an alkylene group having preferably 2 to 18, more preferably 2 to 10, still more preferably 3 to 6 carbon atoms, a cycloalkylene group having preferably 4 to 20, more preferably 5 to 20 carbon atoms, or a divalent oxygen- or nitrogen-containing saturated heterocyclic group having preferably 4 to 20, more preferably 5 to 20 carbon atoms.

Examples of the alkylene group having 2 to 18 carbon atoms include an ethylene group, a n-propylene group, an isopropylene group, a n-butylene group, an isobutylene group, a n-pentylene group, a n-hexylene group, a n-heptylene group, a n-octylene group, a 2-ethylhexylene group, a n-nonylene group, a n-decylene group, a n-undecylene group, a n-dodecylene group, a n-tridecylene group, a n-tetradecylene group, a n-pentadecylene group, a n-hexadecylene group, a n-heptadecylene group, and a n-octadecylene group. Examples of the cycloalkylene group having 4 to 20 carbon atoms include a cyclopentylene group, a cyclohexylene group, a cyclooctylene group, a cyclodecylene group, a cyclotetradecylene group, an adamantylene group, a bicycloheptylene group, a bicyclodecylene group, and a tricyclodecylene group. Examples of the divalent oxygen- or nitrogen-containing saturated heterocyclic group may include groups each containing an oxygen or nitrogen atom in the skeleton of any one of the cycloalkylene groups.

Specifically, the polycarbonate block (A-2) formed of the repeating unit represented by the formula (2) preferably has at least one selected from the group consisting of repeating units represented by the following formulae (a-i) to (a-xiii), more preferably has at least one selected from the group consisting of the repeating units represented by the following formulae (a-i) to (a-v), and still more preferably has one or more selected from the group consisting of the repeating units represented by the following formulae (a-i), (a-ii), and (a-v) in terms of high transparency.

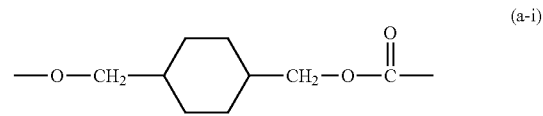

(a-i)

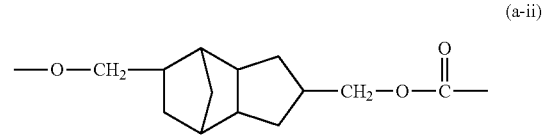

(a-ii)

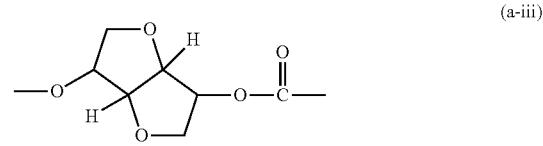

(a-iii)

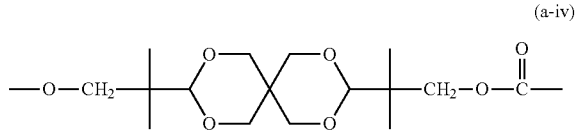

(a-iv)

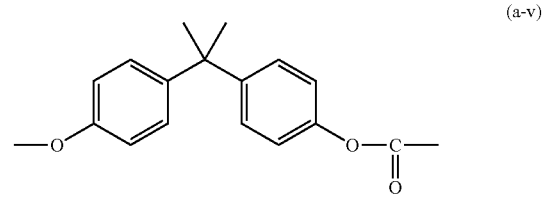

(a-v)

(a-vi) 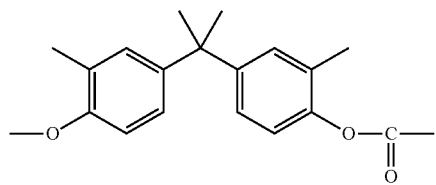

(a-vii) 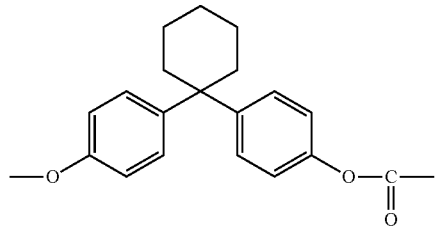

(a-viii) 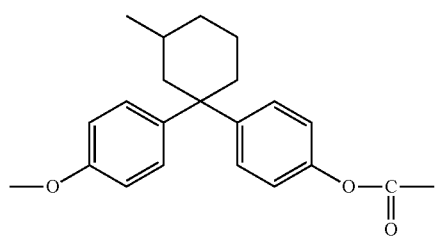

(a-ix) 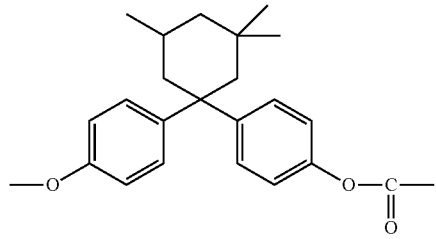

(a-x) 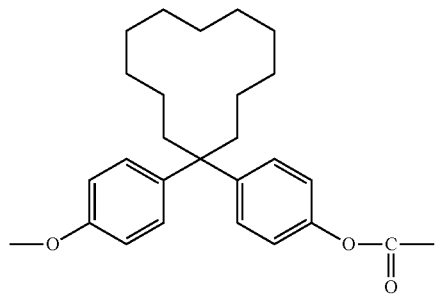

(a-xi) 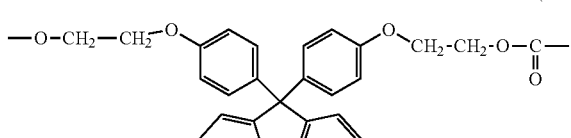

(a-xii) 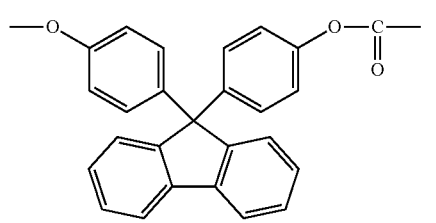

(a-xiii) 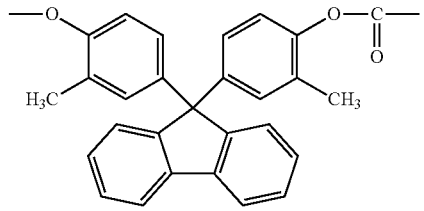

The polycarbonate block (A-2) represented by the formula (2) preferably includes a structural unit derived from: an aromatic bisphenol selected from the group consisting of 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3-methylcyclohexane, 1,1-bis(4-hydroxyphenyl)-3,3,5-trimethylcyclohexane, and 1,1-bis(4-hydroxyphenyl)cyclododecene; or an aliphatic diol selected from the group consisting of isosorbide, cyclohexane-1,4-dimethanol, tricyclodecanedimethanol, 3,9-bis(1,1-dimethyl-2-hydroxyethyl)-2,4,8,10-tetraoxaspiro[5.5]undecane, 1,3-propanediol, and 1,4-butanediol.

The polycarbonate block (A-2) formed of the repeating unit represented by the formula (2) more preferably has one or more selected from the group consisting of the repeating units represented by the following formulae (a-i) to (a-v) among them.

(a-i) 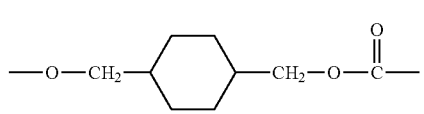

(a-ii) 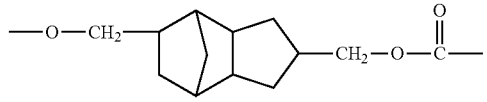

(a-iii) 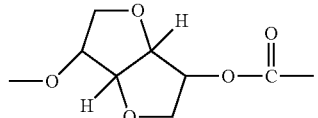

(a-iv) 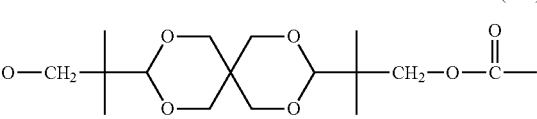

(a-v) 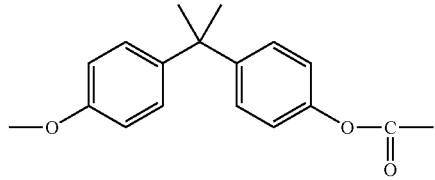

"y" representing the number of units of the polycarbonate block (A-2) represented by the formula (2) represents more preferably from 20 to 200, still more preferably from 40 to 100. "y" is preferably set to 20 or more because an increase in amount of a low-molecular weight component in the copolymer can be suppressed. "y" is more preferably set to 40 or more because the toughness of the copolymer is improved. "y" is preferably set to 200 or less because moderate flowability is obtained at the time of the molding of the copolymer. "y" is more preferably set to 100 or less because a reaction mixture at the time of the production of the copolymer has moderate flowability, and hence productivity is improved.

The content of the polyorganosiloxane block represented by the formula (1) in the polycarbonate-polyorganosiloxane copolymer is preferably from 0.1 mass % to 60 mass %, more preferably from 0.5 mass % to 50 mass %, still more preferably from 1 mass % to 30 mass %, still more preferably from 3 mass % to 20 mass %.

When the content of the polyorganosiloxane block in the polycarbonate-polyorganosiloxane copolymer falls within the ranges, more excellent impact resistance and more excellent transparency can be obtained.

The polycarbonate-polyorganosiloxane copolymer of the present invention needs not only to have the above-mentioned specific structure but also to satisfy the condition (A) or the condition (B). The polycarbonate-polyorganosiloxane copolymer may satisfy both of the condition (A) and the condition (B).

The polycarbonate-polyorganosiloxane copolymer satisfying the condition (A) or the condition (B) is obtained by, for example, introducing a substituent having a repeating chain structure containing a polar functional group, which is a substituent having a high affinity for a hydroxyl group of the diol monomer, into a terminal of the polyorganosiloxane.

The above-mentioned substituent having a repeating chain structure can be brought into contact with a larger number of molecules of the diol monomer than a substituent free of any repeating chain structure does, and is hence assumed to be capable of being strongly compatible with the diol monomer. Accordingly, it is assumed that in the case where the substituent having a repeating chain structure is introduced into the terminal of the polyorganosiloxane, an affinity between the polyorganosiloxane and the diol monomer can be improved as compared to the case where the substituent having a repeating chain structure is not introduced into the terminal.

<Condition (A)>

The condition requires that the hexane extraction amount of the polycarbonate-polyorganosiloxane copolymer be 150 ppm by mass or less. The phrase "hexane extraction amount is 150 ppm by mass or less" means that a homocoupling component in which the molecules of one and the same raw material are bonded to each other, a cyclic component produced by the intramolecular reaction of an unreacted raw material or an oligomer, an unreacted diol monomer, or an unreacted terminal-modified polyorganosiloxane is present in a small amount at the time of the production of the polycarbonate-polyorganosiloxane copolymer, and hence the polyorganosiloxane block is sufficiently introduced.

The hexane extraction amount of the polycarbonate-polyorganosiloxane copolymer in the condition (A) is preferably 100 ppm by mass or less, more preferably 80 ppm by mass or less, still more preferably 70 ppm by mass or less, still more preferably 60 ppm by mass or less. When the condition (A) is satisfied, the lower limit of the hexane extraction amount is not particularly limited. However, by a reason in terms of synthesis, the lower limit is, for example, 10 ppm by mass or more, and is 20 ppm by mass or more in one aspect. When the polycarbonate-polyorganosiloxane copolymer is produced by an interfacial polymerization method, the hexane extraction amount can be relatively suppressed as compared to the melt polymerization method. The reason for the foregoing is as described below. In the interfacial polymerization method including using methylene chloride and water as solvents, a raw material and a polymer growth terminal can be brought into contact with each other with efficiency higher than that in the melt polymerization method to be performed without any solvent. Accordingly, the ratio at which the raw material is converted into the polymer is high, and hence an unreacted raw material or a low-molecular weight by-product that may be extracted with hexane is hardly produced. However, when the melt polymerization method is selected, it is typically difficult to cause the hexane extraction amount to satisfy the condition (A). In the present invention, the polycarbonate-polyorganosiloxane copolymer having a specific structure is produced, and hence an aspect in which the condition can be satisfied even when the copolymer is produced by the melt polymerization method is achieved.

Conditions for the extraction with hexane are described in detail in Examples.

<Condition (B)>

The condition (B) requires that the average weights of the polyorganosiloxane blocks in the polycarbonate-polyorganosiloxane copolymers obtained by separating the polycarbonate-polyorganosiloxane copolymer with the gel permeation chromatograph satisfy the following expression (B1):

$$0.3 \leq [\text{POS-Mh}]/[\text{POS-M1}] \leq 3 \tag{B1}$$

wherein in the expression (B1), [POS-Mh] represents an average weight of a polyorganosiloxane block in a polycarbonate-polyorganosiloxane copolymer obtained by fractionating a component corresponding to a retention time range of from T1 to T2 with the gel permeation chromatograph, and [POS-M1] represents an average weight of a polyorganosiloxane block in a polycarbonate-polyorganosiloxane copolymer obtained by fractionating a component corresponding to a retention time range of from T2 to T3 with the gel permeation chromatograph:

T1: a retention time at which a peak top in a gel permeation chromatogram of a standard polystyrene having a ratio Mw/Mn of 1.01 and a Mw of 98,900 is positioned;

T2: a retention time at which a peak top in a gel permeation chromatogram of a standard polystyrene having a ratio Mw/Mn of 1.01 and a Mw of 13,700 is positioned; and T3: a retention time at which a peak top in a gel permeation chromatogram of a standard polystyrene having a ratio Mw/Mn of 1.03 and a Mw of 3,120 is positioned.

Measurement with the gel permeation chromatograph (GPC) may be specifically performed under conditions described in Examples. A case in which the value of the ratio [POS-Mh]/[POS-M1] deviates from the range represented by the expression (B1) means that the siloxane is not uniformly incorporated into the main chain of the polymer. The lower limit value of the ratio [POS-Mh]/[POS-M1] is preferably 0.35 or more, more preferably 0.5 or more, still more preferably 0.8 or more, and the upper limit value thereof is preferably 2.8 or less, more preferably 2 or less, still more preferably 1.4 or less, still more preferably 1.25 or less, particularly preferably 1.2 or less.

The viscosity-average molecular weight of the polycarbonate-polyorganosiloxane copolymer of the present invention is preferably 5,000 or more and 50,000 or less. The viscosity-average molecular weight is more preferably 12,000 or more, still more preferably 14,000 or more, particularly preferably 16,000 or more, and is more preferably 30,000 or less, still more preferably 23,000 or less, particularly preferably 21,000 or less.

The viscosity-average molecular weight (Mv) is a value calculated from the following Schnell's equation by measuring the limiting viscosity [η] of a methylene chloride solution (concentration: g/L) at 20° C.

$$[\eta]=1.23\times10^{-5}Mv^{0.83}$$

Although the refractive index of the polycarbonate-polyorganosiloxane copolymer of the present invention is not particularly limited, for example, the refractive index thereof for light having a wavelength of 589.3 nm is preferably 1.430 or more and 1.590 or less, more preferably 1.450 or more and 1.570 or less, still more preferably 1.470 or more and 1.550 or less.

A difference (nF−nC) between the refractive index (nF) of the polycarbonate resin for light having a wavelength of 486.1 nm and the refractive index (nC) thereof for light having a wavelength of 656.3 nm is preferably 0.015 or less, more preferably 0.013 or less, still more preferably 0.011 or less.

<Method of Producing Polycarbonate-Polyorganosiloxane Copolymer>

The polycarbonate-polyorganosiloxane copolymer of the present invention may be produced by using the diol monomer (a1) and a polyorganosiloxane (a2) as raw material monomers.

<<Diol Monomer (a1)>>

The diol monomer (a1) is not particularly limited as long as the monomer has a structure represented by the following formula (a1). An aromatic dihydroxy compound or an aliphatic dihydroxy compound may be used as the diol monomer (a1).

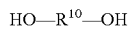     (a1)

In the formula (a1), $R^{10}$ is as described above, and preferred examples thereof are also the same as those described above.

Examples of the aliphatic dihydroxy compound include: dihydroxy compounds each having a chain aliphatic hydrocarbon group, such as ethylene glycol, 1,3-propanediol, 1,2-propanediol, 1,4-butanediol, 1,5-pentanediol, 1,6-hexanediol, 1,7-heptanediol, 1,8-octanediol, 1,10-decanediol, 2,2-dimethylpropane-1,3-diol, diethylene glycol, triethylene glycol, tetraethylene glycol, octaethylene glycol, dipropylene glycol, N-methyldiethanolamine, and p-xylylene glycol; dihydroxy compounds each having an alicyclic hydrocarbon group, such as 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 2,6-decalindiol, 1,5-decalindiol, 2,3-decalindiol, 2,6-decalindimethanol, 1,5-decalindimethanol, 2,3-decalindimethanol, 2,3-norbornanediol, 2,5-norbornanediol, 2,3-norbornanedimethanol, 2,5-norbornanedimethanol, 2,2-bis(4-hydroxycyclohexyl)-propane, 1,3-adamantanediol, 1,3-adamantanedimethanol, and tricyclodecanedimethanol; condensed polycyclic ether diols, such as isosorbide; heterocyclic spiro compounds, such as 3,9-bis(2-hydroxyethyl)-2,4,8,10-tetraoxaspiro[5.5]undecane, 3,9-bis(2-hydroxy-1,1-dimethylethyl)-2,4,8,10-tetraoxaspiro[5.5]undecane, 3,9-bis(2-hydroxy-1,1-diethylethyl)-2,4,8,10-tetraoxaspiro[5.5]undecane, 3,9-bis(2-hydroxy-1,1-dipropylethyl)-2,4,8,10-tetraoxaspiro[5.5]undecane, and a cyclic ether diol, such as 1,4-anhydroerythritol; cyclic acetal diols, such as 2-(5-ethyl-5-hydroxymethyl-1,3-dioxan-2-yl)-2-methylpropan-1-ol; N-heterocyclic diols, such as 3,4-pyrrolidinediol, 3,4-dimethylpiperidinediol, N-ethyl-3,4-piperidinediol, and N-ethyl-3,5-piperidinediol; and S-heterocyclic diols, such as deoxythiofructose.

Specifically, the aliphatic dihydroxy compound may be particularly preferably, for example, an aliphatic diol selected from isosorbide, cyclohexane-1,4-dimethanol, tricyclodecanedimethanol, 3,9-bis(2-hydroxy-1,1-dimethylethyl)-2,4,8,10-tetraoxaspiro[5.5]undecane, 1,3-propanediol, and 1,4-butanediol.

The aromatic dihydroxy compound may be, for example, an aromatic bisphenol compound. Specific examples thereof may include bisphenol A, bisphenol C, bisphenol Z, and an aromatic bisphenol selected from compounds represented by the following formulae.

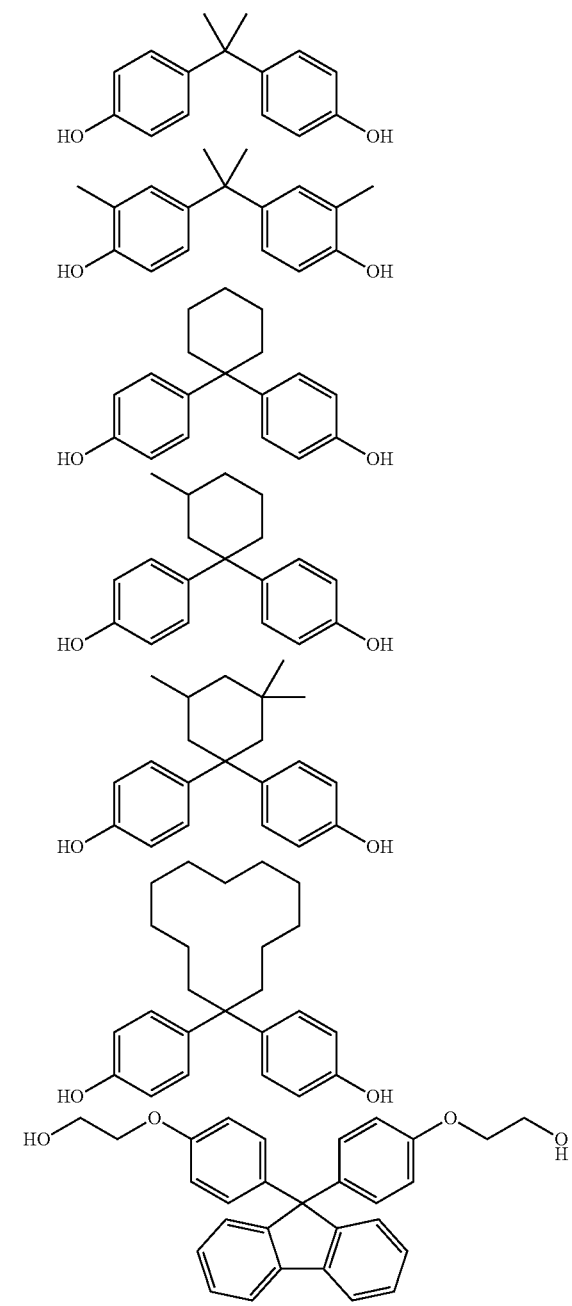

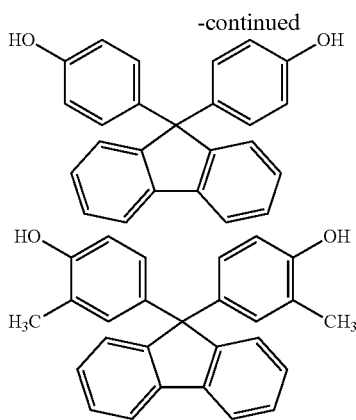

Specifically, bisphenol A (2,2-bis(4-hydroxyphenyl)propane), bisphenol C (2,2-bis(4-hydroxy-3-methylphenyl)propane), bisphenol Z (1,1-bis(4-hydroxyphenyl)cyclohexane), bisphenol 3MZ (1,1-bis(4-hydroxyphenyl)-3-methylcyclohexane), bisphenol HTG (1,1-bis(4-hydroxyphenyl)-3,3,5-trimethylcyclohexane), or bisphenol-CDE (1,1-bis(4-hydroxyphenyl)cyclododecene) is more preferably used.

Among them, the aliphatic diol is preferably used as the diol monomer (a1) because high transparency of the polycarbonate-polyorganosiloxane copolymer to be obtained can be obtained.

<<Polyorganosiloxane (a2)>>

The polyorganosiloxane (a2) preferably has a structure represented by the following formula (a2-0):

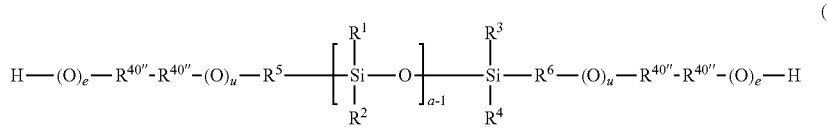

(a2-0)

wherein $R^1$ to $R^4$ may be identical to or different from each other, and each independently represent a hydrogen atom, a halogen atom, an alkyl group having 1 to 10 carbon atoms, an alkoxy group having 1 to 10 carbon atoms, an aryl group having 6 to 12 carbon atoms, or an alkylaryl group whose alkyl group moiety has 1 to 10 carbon atoms, $R^5$ and $R^6$ may be identical to or different from each other, and each independently represent an arylene group having 6 to 20 carbon atoms, an alkylene group having 1 to 10 carbon atoms, or an alkylarylene group whose alkyl group moiety has 1 to 10 carbon atoms, and may each contain, as a functional group, —O—, —COO—, —CO—, —S—, —NH—, or —NR$^{111}$—, R$^{111}$ represents an alkyl group having 1 to 10 carbon atoms or an aryl group having 6 to 10 carbon atoms, and "a" represents an integer of from 2 to 500.

$R^{40'}$ represents a divalent aliphatic hydrocarbon group having 2 to 380 carbon atoms, a divalent alicyclic hydrocarbon group having 3 to 380 carbon atoms, or a divalent aromatic hydrocarbon group having 6 to 380 carbon atoms, and may be substituted with a substituent, the divalent aliphatic hydrocarbon group, the divalent alicyclic hydrocarbon group, or the divalent aromatic hydrocarbon group may contain at least one heteroatom selected from an oxygen atom, a nitrogen atom, and a sulfur atom, or at least one halogen atom selected from a fluorine atom, a chlorine atom, a bromine atom, and an iodine atom, $R^{40''}$ represents a divalent aliphatic hydrocarbon group having 1 to 20 carbon atoms, a divalent alicyclic hydrocarbon group having 3 to 20 carbon atoms, or a divalent aromatic hydrocarbon group having 6 to 20 carbon atoms, and may be substituted with a substituent, and "e" and "u" each represent 0 or 1.

The polyorganosiloxane preferably includes, as $R^{40'}$, a repeating chain structure in which at least two structures each containing at least one hydrocarbon group selected from a divalent aliphatic hydrocarbon group having 1 to 20 carbon atoms, a divalent alicyclic hydrocarbon group having 3 to 20 carbon atoms, and a divalent aromatic hydrocarbon group having 6 to 20 carbon atoms, and each containing at least one heteroatom selected from the group consisting of an oxygen atom, a nitrogen atom, and a sulfur atom are linked to each other. Preferred examples of the repeating chain structure may include the following structures: polyether, polyacetal, polylactone, polyacrylate, polyester, polycarbonate, polyketone, polysulfide, polysulfone, polyamide, and polyimide.

Among them, at least one selected from the group consisting of polyether, polyacrylate, and polycarbonate is preferred, and polyether is most preferred. As the polyether, a polyalkylene ether is preferred. Among them, polyethylene glycol, polypropylene glycol, polytrimethylene glycol, and polytetramethylene glycol are preferred. The above-mentioned structures are preferred from the viewpoint of improving the affinity of the polyorganosiloxane for the diol monomer (a1) to perform uniform polymerization.

A monomer having a structure represented by any one of the following formulae (a2-1) to (a2-3) may be used as the polyorganosiloxane (a2):

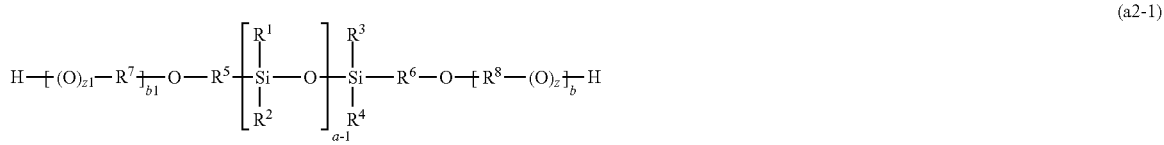

(a2-1)

-continued

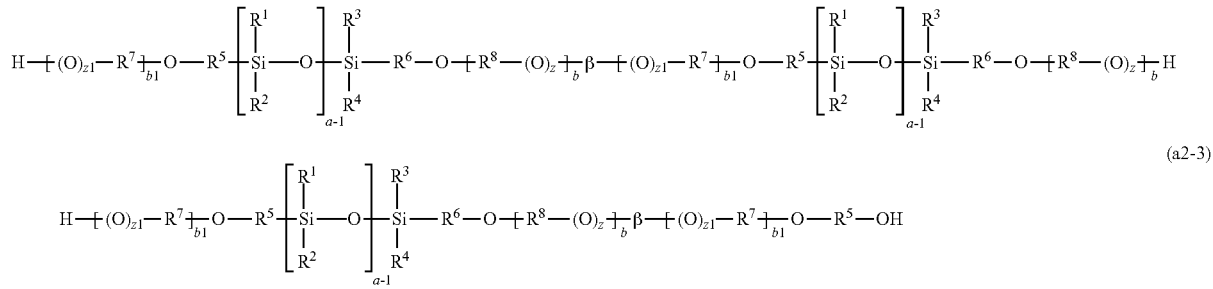

wherein $R^1$ to $R^4$, $R^5$ and $R^6$, $R^7$ and $R^8$, "z", "z1", β, "a", "b", and "b1" are as described above, and preferred examples thereof are also the same as those described above, and a combination of preferred examples is similarly preferred.

In the formulae (a2-0) and (a2-1) to (a2-3), "a" represents the chain length of the polyorganosiloxane, and represents an integer of 2 or more and 500 or less, preferably 2 or more and 300 or less, more preferably 10 or more and 100 or less, still more preferably 15 or more and 70 or less, still more preferably 20 or more and 65 or less from the viewpoint of improving the affinity of the polyorganosiloxane for the diol monomer (a1) to perform uniform polymerization.

In the formulae (a2-1) to (a2-3), "b" represents an integer of 2 or more and 200 or less, preferably 2 or more and 100 or less, more preferably 5 or more and 50 or less, still more preferably 8 or more and 25 or less. "b" preferably falls within the ranges from the viewpoint of improving the affinity for the diol monomer (a1) to perform uniform polymerization.

The polycarbonate-polyorganosiloxane copolymer of the present invention may be produced through the polymerization of raw material monomers by an interfacial polymerization method or a melt polymerization method (ester exchange method). When the copolymer is produced by the interfacial polymerization method, reference may be made to, for example, a method described in JP 2014-80462 A. The polycarbonate-polyorganosiloxane copolymer of the present invention may be produced by causing the polyorganosiloxane (a2), the diol monomer (a1), and the carbonic acid ester compound, which are the raw material monomers, to react with each other by the melt polymerization method in the presence of the basic catalyst, and preferably, a chain-end terminator.

(Carbonic Acid Diester)

The carbonic acid diester is at least one kind of compound selected from a diaryl carbonate compound, a dialkyl carbonate compound, and an alkyl aryl carbonate compound.

The diaryl carbonate compound is a compound represented by the following formula (11) or a compound represented by the following formula (12):

(11)

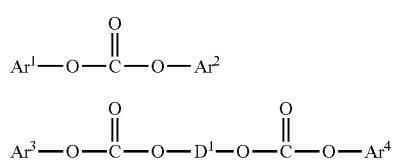

(12)

wherein
in the formula (11), $Ar^1$ and $Ar^2$ each represent an aryl group, and the groups may be identical to or different from each other, and in the formula (12), $Ar^3$ and $Ar^4$ each represent an aryl group, and the groups may be identical to or different from each other, and $D^1$ represents a residue obtained by removing two hydroxyl groups from the aromatic dihydroxy compound or the aliphatic dihydroxy compound.

The dialkyl carbonate compound is a compound represented by the following formula (13) or a compound represented by the following formula (14):

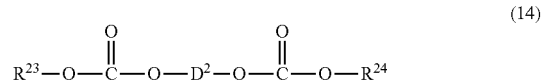

wherein
in the formula (13), $R^{21}$ and $R^{22}$ each represent an alkyl group having 1 to 20 carbon atoms or a cycloalkyl group having 4 to 20 carbon atoms, and the groups may be identical to or different from each other, and in the formula (14), $R^{23}$ and $R^{24}$ each represent an alkyl group having 1 to 20 carbon atoms or a cycloalkyl group having 4 to 20 carbon atoms, and the groups may be identical to or different from each other, and $D^2$ represents a residue obtained by removing two hydroxyl groups from the aromatic dihydroxy compound or the aliphatic dihydroxy compound.

The alkyl aryl carbonate compound is a compound represented by the following formula (15) or a compound represented by the following formula (16):

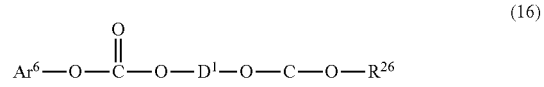

wherein
in the formula (15), $Ar^5$ represents an aryl group, and $R^{25}$ represents an alkyl group having 1 to 20 carbon atoms or a cycloalkyl group having 4 to 20 carbon atoms, and in the formula (16), $Ar^6$ represents an aryl group, $R^{26}$ represents an alkyl group having 1 to 20 carbon atoms or a cycloalkyl group having 4 to 20 carbon atoms, and $D^1$ represents a residue obtained by removing two hydroxyl groups from the aromatic dihydroxy compound or the aliphatic dihydroxy compound.

Examples of the diaryl carbonate compound include diphenyl carbonate, ditolyl carbonate, bis(chlorophenyl) carbonate, bis(m-cresyl) carbonate, dinaphthyl carbonate, bis(diphenyl) carbonate, and bisphenol A bisphenyl carbonate.

Examples of the dialkyl carbonate compound include diethyl carbonate, dimethyl carbonate, dibutyl carbonate, dicyclohexyl carbonate, and bisphenol A bismethyl carbonate.

Examples of the alkyl aryl carbonate compound include methyl phenyl carbonate, ethyl phenyl carbonate, butyl phenyl carbonate, cyclohexyl phenyl carbonate, and bisphenol A methyl phenyl carbonate.

In the production of the polycarbonate-polyorganosiloxane copolymer of the present invention, one kind of the compounds may be, or two or more kinds thereof may each be, appropriately selected and used as the carbonic acid diester. Among them, diphenyl carbonate is preferably used.

(Chain-End Terminator)

In the production of the polycarbonate-polyorganosiloxane copolymer of the present invention, a chain-end terminator may be used as required. Any known chain-end terminator in the production of a polycarbonate resin may be used as the chain-end terminator. Specific examples thereof may include the following compounds: phenol, p-cresol, p-tert-butylphenol, p-tert-octylphenol, p-cumylphenol, p-nonylphenol, and p-tert-amylphenol. Those monohydric phenols may be used alone or in combination thereof.

(Branching Agent)

In the production of the polycarbonate-polyorganosiloxane copolymer of the present invention, a branching agent may be used. Examples of the branching agent include: phloroglucin; trimellitic acid; 1,1,1-tris(4-hydroxyphenyl)ethane; 1-[α-methyl-α-(4'-hydroxyphenyl)ethyl]-4-[α',α'-bis(4''-hydroxyphenyl)ethyl]benzene; α,α',α''-tris(4-hydroxyphenyl)-1,3,5-triisopropylbenzene; and isatinbis(o-cresol).

Specifically, the polycarbonate-polyorganosiloxane copolymer of the present invention may be produced by the melt polymerization method in accordance with, for example, the following procedure.

The diol monomer (a1), the polyorganosiloxane (a2), and the carbonic acid ester compound are subjected to an ester exchange reaction. The molar amount of the carbonic acid ester compound is preferably from 0.9 times to 1.2 times, more preferably from 0.98 times to 1.02 times as large as that of the diol monomer.

At the time of the ester exchange reaction, the chain-end terminator is preferably present in an amount within the range of from 0.05 mol % to 10 mol % with respect to the diol monomer (a1) and the polyorganosiloxane (a2) because a hydroxyl group terminal of the polycarbonate-polyorganosiloxane copolymer to be obtained is sealed, and hence a polycarbonate resin sufficiently excellent in heat resistance and water resistance is obtained. The chain-end terminator is more preferably present in an amount of from 1 mol % to 6 mol % with respect to the diol monomer (a1) and the polyorganosiloxane (a2). The total amount of the chain-end terminator may be added to a reaction system in advance, or the following may be adopted: part of the chain-end terminator is added to the reaction system in advance, and the remainder thereof is added thereto along with the progress of the reaction.

The ester exchange reaction is preferably performed in the presence of an antioxidant by simultaneously loading the antioxidant into a reactor together with the diol monomer (a1), the polyorganosiloxane (a2), and the carbonic acid ester compound.

When the ester exchange reaction is performed, a reaction temperature is not particularly limited, and in normal cases, the temperature is selected from the range of from 100° C. to 330° C., preferably from the range of from 180° C. to 300° C., more preferably from the range of from 200° C. to 240° C. A method including gradually increasing the temperature to from 180° C. to 300° C. in accordance with the progress of the reaction is particularly preferred. When the temperature of the ester exchange reaction is 100° C. or more, a reaction rate increases. Meanwhile, when the temperature is 330° C. or less, no side reaction occurs and a problem such as the coloring of the polycarbonate-polyorganosiloxane copolymer to be produced hardly occurs.

A reaction pressure is set depending on the vapor pressure of a monomer to be used and the reaction temperature. The pressure is not particularly limited as long as the pressure is set so that the reaction may be efficiently performed. In normal cases, the following is often adopted: at the initial stage of the reaction, the pressure is set to an atmospheric pressure (normal pressure) or pressurized state ranging from 1 atm to 50 atm (760 torr to 38,000 torr), and at the later stage of the reaction, the pressure is set to a decompressed state, preferably from 1.33 Pa to $1.33 \times 10^4$ Pa (0.01 torr to 100 torr) in the end.

The reaction only needs to be performed until a target molecular weight is obtained, and a reaction time is typically from about 0.2 hour to about 10 hours.

The ester exchange reaction, which is typically performed in the absence of an inert solvent, may be performed in the presence of 1 part by mass to 150 parts by mass of the inert solvent with respect to 100 parts by mass of the polycarbonate resin to be obtained as required. Examples of the inert solvent include: aromatic compounds, such as diphenyl ether, halogenated diphenyl ether, benzophenone, polyphenyl ether, dichlorobenzene, and methylnaphthalene; and cycloalkanes, such as tricyclo[$5.2.1.0^{2,6}$]decane, cyclooctane, and cyclodecane.

The reaction may be performed under an inert gas atmosphere as required, and examples of the inert gas include various gases, such as: gases such as argon, carbon dioxide, dinitrogen monoxide, and nitrogen; chlorofluorohydrocarbons; alkanes, such as ethane and propane; and alkenes, such as ethylene and propylene.

In the melt polymerization method, the basic catalyst is preferably used as a catalyst. The basic catalyst may be, for example, at least one kind selected from the group consisting of a metal catalyst, such as an alkali metal compound or an alkaline earth metal compound, a nitrogen-containing compound, an organic catalyst, such as a quaternary phosphonium salt containing an aryl group, and a metal compound. Those compounds may be used alone or in combination thereof.

As the basic catalyst, there is preferably used, for example, any one of the following catalysts: an organic acid salt, an inorganic salt, an oxide, a hydroxide, a hydride, and an alkoxide of an alkali metal or an alkaline earth metal; a quaternary ammonium hydroxide; and a quaternary phosphonium salt containing an aryl group. The basic catalysts may be used alone or in combination thereof.

Examples of the alkali metal compound include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogen phosphate, dipotassium hydrogen phosphate, dilithium hydrogen phosphate, disodium phenyl phosphate; disodium salt, dipotassium salt, dicesium salt, or dilithium salt of bisphenol A; and sodium salt, potassium salt, cesium salt, or lithium salt of phenol.

Example of the alkaline earth metal compound include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate, and barium diacetate.

Examples of the nitrogen-containing compound include: quaternary ammonium hydroxides having an alkyl group, an aryl group, or the like, such as tetramethylammonium hydroxide, tetraethylammonium hydroxide, tetrapropylammonium hydroxide, tetrabutylammonium hydroxide, and trimethylbenzylammonium hydroxide; tertiary amines, such as triethylamine, dimethylbenzylamine, and triphenylamine; imidazoles, such as 2-methylimidazole, 2-phenylimidazole, and benzimidazole; and bases or basic salts, such as ammonia, tetramethylammonium borohydride, tetrabutylammonium borohydride, tetrabutylammonium tetraphenylborate, and tetraphenylammonium tetraphenylborate.

Examples of the metal compound include a zinc-aluminum compound, a germanium compound, an organotin compound, an antimony compound, a manganese compound, a titanium compound, and a zirconium compound.

Specific examples of the quaternary phosphonium salt containing an aryl group include: tetra(aryl or alkyl)phosphonium hydroxides, such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetramethylphosphonium hydroxide, tetraethylphosphonium hydroxide, and tetrabutylphosphonium hydroxide; and tetramethylphosphonium tetraphenylborate, tetraphenylphosphonium bromide, tetraphenylphosphonium phenolate, tetraphenylphosphonium tetraphenylborate, methyltriphenylphosphonium tetraphenylborate, benzyltriphenylphosphonium tetraphenylborate, biphenyltriphenylphosphonium tetraphenylborate, tetratolylphosphonium tetraphenylborate, tetraphenylphosphonium phenolate, tetra(p-t-butylphenyl)phosphonium diphenylphosphate, triphenylbutylphosphonium phenolate, and triphenylbutylphosphonium tetraphenylborate.

The quaternary phosphonium salt containing an aryl group is preferably combined with a nitrogen-containing organic basic compound, and for example, a combination of tetramethylammonium hydroxide and tetraphenylphosphonium tetraphenylborate is preferred.

The usage amount of the basic catalyst may be selected from the range of preferably from $1 \times 10^{-9}$ mol to $1 \times 10^{-2}$ mol, preferably from $1 \times 10^{-8}$ mol to $1 \times 10^{-2}$ mol, more preferably from $1 \times 10^{-7}$ mol to $1 \times 10^{-3}$ mol with respect to 1 mol of the diol monomer.

A catalyst deactivator may be added at the later stage of the reaction. As the catalyst deactivator to be used, a known catalyst deactivator may be effectively used, and among them, ammonium salts or phosphonium salts of sulfonic acid are preferred. Further, salts of dodecylbenzenesulfonic acid, such as tetrabutylphosphonium dodecylbenzenesulfonate, or salts of p-toluenesulfonic acid, such as tetrabutylammonium p-toluenesulfonate, are preferred.

As esters of sulfonic acid, methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, phenyl p-toluenesulfonate, and the like are also preferably used. Among them, tetrabutylphosphonium dodecylbenzenesulfonate or butyl p-toluenesulfonate is most preferably used.

With regard to the usage amount of the catalyst deactivator, when at least one kind of polymerization catalyst selected from alkali metal compounds and alkaline earth metal compounds is used, the catalyst deactivator may be used preferably at a ratio of from 0.5 mol to 50 mol, more preferably at a ratio of from 0.5 mol to 10 mol, still more preferably at a ratio of from 0.8 mol to 5 mol per 1 mol of the catalyst.

The antioxidant is preferably mixed after the catalyst deactivator has been added to terminate the polymerization reaction.

The reaction in the melt polymerization method may be performed by any one of a continuous system and a batch system. A reactor to be used in melt polymerization may be any one of: a vertical reactor equipped with, for example, an anchor-type stirring blade, a max blend stirring blade, or a helical ribbon-type stirring blade; and a horizontal reactor equipped with, for example, a paddle blade, a lattice blade, or a spectacle blade. Further, the reactor may be of an extruder type equipped with a screw. In the case of the continuous system, an appropriate combination of such reactors is preferably used.

The polycarbonate-polyorganosiloxane copolymer of the present invention is preferably produced by using raw materials satisfying the following condition:

condition (i): a mixture, which is obtained by bringing a raw material diol monomer (a1), a raw material polyorganosiloxane (a2), a carbonic acid diester, and a basic catalyst into contact with each other at from 100° C. to 250° C. for from 0.5 hour to 5 hours, has a haze value of 30 or less measured under conditions of 23° C. and an optical path length of 10 mm in conformity with ISO 14782:1999.

The haze value is a value obtained by subjecting a glass cell having an optical path length of 10 mm, which is filled with the mixture, to measurement with a haze-measuring apparatus at 23° C. in conformity with ISO 14782:1999. Conditions for the measurement of the haze value of the raw material mixture are different from polymerization conditions, and are merely conditions to be used at the time of the selection of the raw materials.

The haze value of the raw material mixture after its heating treatment preferably falls within the range because the polycarbonate-polyorganosiloxane copolymer to be obtained has high transparency.

The haze value of the raw material mixture after the heating treatment is more preferably 20 or less, still more preferably 10 or less, still more preferably 5 or less, still more preferably 1 or less.

Conditions for obtaining the mixture for the measurement of the haze value are as described in the condition (i). Further, in the condition (i), the temperature condition is preferably from 150° C. to 250° C., more preferably from 180° C. to 250° C., and the contact time is preferably from 0.7 hour to 4 hours, more preferably from 0.7 hour to 2 hours. When the temperature condition and the contact time in the condition (i) fall within the suitable ranges, and the mixture to be obtained has the haze value specified in the condition (i), a polycarbonate-polyorganosiloxane copolymer having higher transparency can be obtained.

<Polycarbonate-Based Resin Composition>

The polycarbonate-based resin composition of the present invention includes the above-mentioned polycarbonate-polyorganosiloxane copolymer (polycarbonate-polyorganosiloxane copolymer (A)).

A well-known additive may be used in the polycarbonate-based resin composition of the present invention as long as the characteristics of the polycarbonate-polyorganosiloxane copolymer (A) are not impaired.

(Additive)

A known additive may be blended into the polycarbonate-based resin composition of the present invention in accordance with its applications or as required. Examples of the additive include various fillers, an antioxidant, a heat stabilizer, a plasticizer, a light stabilizer, a polymerization metal deactivator, a flame retardant, a lubricant, an antistatic agent, a surfactant, an antimicrobial agent, a UV absorber, and a release agent.

The antioxidant can suppress the decomposition of a resin at the time of the production or molding of a thermoplastic resin composition.

[Filler]

The filler that may be blended into the polycarbonate-based resin composition of the present invention is, for example, an inorganic filler, such as a spherical filler, a plate-like filler, or a fibrous filler.

Examples of the spherical filler include calcium carbonate, kaolin (aluminum silicate), silica, pearlite, shirasu balloons, sericite, diatomaceous earth, calcium sulfite, calcined alumina, calcium silicate, crystalline zeolite, and amorphous zeolite.

Examples of the plate-like filler include talc, mica, and wollastonite.

Examples of the fibrous filler include: needle-like fillers, such as a glass fiber, a carbon fiber, and wollastonite; and fibrous fillers, such as magnesium oxysulfate, a potassium titanate fiber, and fibrous calcium carbonate. The inorganic filler is preferably a glass fiber or a carbon fiber.

Fibers each using any one of, for example, an alkali glass, a low-alkali glass, and a non-alkali glass as a raw material may each be suitably used as the glass fiber.

The forms of those glass fibers are not particularly limited, and fibers of any forms, such as a roving, a milled fiber, and a chopped strand, may be used.

A commercial product of the glass fiber is, for example, CSH-3PA (manufactured by Nitto Boseki Co., Ltd.), T-511 (manufactured by Nippon Electric Glass Co., Ltd.), or MA-409C (manufactured by Asahi Fiber Glass Co., Ltd.).

The polycarbonate-based resin composition of the present invention preferably includes a glass filler from the viewpoint of reinforcing the resin composition.

[Composition Ratio]

The polycarbonate-based resin composition of the present invention may include preferably 1 part by mass to 150 parts by mass, more preferably 11 parts by mass to 100 parts by mass, still more preferably 15 parts by mass to 60 parts by mass, still more preferably 15 parts by mass to 40 parts by mass of the inorganic filler with respect to 100 parts by mass of the polycarbonate-polyorganosiloxane copolymer (A). When the content is set within the ranges, various mechanical property-improving effects resulting from the inorganic filler, for example, an improvement in strength, such as an elastic modulus, can be achieved without the impairment of the characteristics of the polycarbonate-polyorganosiloxane copolymer (A).

A method of producing the polycarbonate-based resin composition of the present invention is not particularly limited as long as the method includes a step of mixing the polycarbonate-polyorganosiloxane copolymer and an optional additive. The composition may be produced by, for example, mixing the polycarbonate-polyorganosiloxane copolymer and the optional additive with a mixer or the like, and melting and kneading the mixture. The melting and kneading may be performed by a method that has been typically employed, for example, a method including using a ribbon blender, a Henschel mixer, a Banbury mixer, a drum tumbler, a single-screw extruder, a twin-screw extruder, a co-kneader, a multi-screw extruder, or the like. A heating temperature at the time of the melting and kneading is appropriately selected from the range of typically from about 150° C. to about 300° C., preferably from about 220° C. to about 300° C.

[Molded Article]

A molded article of the present invention includes the polycarbonate-based resin composition of the present invention. The molded article may be produced through use of a melt-kneaded product of the polycarbonate-based resin composition or a pellet thereof obtained through melting and kneading as a raw material by any one of, for example, an injection molding method, an injection compression molding method, an extrusion molding method, a blow molding method, a press molding method, a vacuum molding method, and an expansion molding method. In particular, the molded article is preferably produced through use of the resultant pellet by the injection molding method or the injection compression molding method.

The thickness of the molded article may be arbitrarily set in accordance with its applications. In particular, when the transparency of the molded article is required, the thickness is preferably from 0.2 mm to 4.0 mm, more preferably from 0.3 mm to 3.0 mm, still more preferably from 0.3 mm to 2.0 mm. When the thickness of the molded article is 0.2 mm or more and 4.0 mm or less, good mechanical strength can be obtained.

A coating film formed of a hard coating film, an antifogging film, an antistatic film, or an antireflection film may be formed on the molded article as required, and a composite coating film formed of two or more kinds thereof may be formed.

Among them, a coating film formed of a hard coating film is particularly preferably formed because the film has good weatherability and can prevent the wear of the surface of the molded article with time. A material for the hard coating film is not particularly limited, and a known material, such as an acrylate-based hard coating agent, a silicone-based hard coating agent, or an inorganic hard coating agent, may be used.

In the case of a molded article including a glass filler, when at least part of the glass filler is present on the outermost surface of the molded article, the surface roughness of the molded article increases and the degree of irregular reflection at the surface of the molded article increases, and as a result, the transparency of the molded article deteriorates in some cases. In view of the foregoing, for example, a method including forming a layer containing a high proportion of the resin (skin layer) on the outermost surface of the molded article to reduce the surface roughness of the molded article is available as a method of reducing the surface roughness of the molded article. In the case of injection molding, a method of forming the skin layer may include setting the temperature of a mold to a temperature higher than a general condition to allow the resin in contact with the mold to easily flow, thereby reducing the surface roughness of the outermost surface of the molded article. In addition, in the case of compression molding, when a pressure at the time of the molding is set to a pressure higher than a general condition, the surface roughness of the outermost surface of the molded article can be reduced. When the surface roughness of the molded article is reduced by employing any such method, the irregular reflection at the surface of the molded article is suppressed and a haze reduces, and as a result, the transparency of the molded article can be improved.

When the molded article thus obtained is molded into a flat plate, the flat plate preferably has a total light transmittance for visible light of 60% or more in the case where the content of the polyorganosiloxane block represented by the formula (1) in the polycarbonate-polyorganosiloxane copolymer is less than 5 mass %, and the average chain length "a" of the polyorganosiloxane block (A-2) in the polycarbonate-polyorganosiloxane copolymer is less than 70. The total light transmittance is more preferably 70% or more, still more preferably 80% or more, still more preferably 85% or more, still more preferably 90% or more. When the content of the polyorganosiloxane block represented by the formula (1) in the polycarbonate-polyorganosiloxane copolymer is 5 mass % or more, the total light transmittance for visible light is preferably 25% or more. When the content of the polyorganosiloxane block represented by the formula (1) in the polycarbonate-polyorganosiloxane copolymer is less than 5 mass %, and the average chain length "a" of the polyorganosiloxane block (A-2) in the polycarbonate-polyorganosiloxane copolymer is less than 70, the haze of the molded article when molded into the flat plate is preferably 40 or less, more preferably 30 or less, still more preferably 15 or less, still more preferably 5 or less.

The molded article having the above-mentioned optical properties may be used in an application where high transparency is required because the molded article is excellent in transparency. The total light transmittance for visible light may be measured in conformity with ISO 13468-1:1996, and the haze may be measured in conformity with ISO 14782:1999.

The molded article including the polycarbonate resin of the present invention can be suitably used in members that are each required to have transparency and rigidity, and further, scratch resistance and weatherability, such as: 1) automobile parts, such as a sunroof, a door visor, a rear window, and a side window; 2) building parts, such as a building glass, a soundproof wall, a car port, a sunroom, and gratings; 3) windows for railway vehicles and ships; 4) parts for electrical instruments, such as various parts for a television, a radio-cassette recorder, a video camera, a video tape recorder, an audio player, a DVD player, a telephone, a display, a computer, a register, a copying machine, a printer, a facsimile, and the like, and respective parts for outer plates and housings thereof; 5) parts for precision instruments, such as casings and covers for precision machines, such as a cellular phone, a PDA, a camera, a slide projector, a watch, an electronic calculator, a measuring instrument, and a display instrument; 6) agricultural parts, such as a vinyl house and a greenhouse; and 7) furniture parts, such as a lighting cover, blinds, and interior tools.

EXAMPLES

The present invention is described in more detail below by way of Examples, but the present invention is not limited to these Examples.

Characteristic values in the respective examples were determined in accordance with the following procedures.

<Method of Measuring Hexane Extraction Amount>

A hexane extraction amount was measured by the following method.

A sample obtained by pulverizing a pellet of a polycarbonate-polyorganosiloxane copolymer obtained in each of Examples and Comparative Examples described below with a crusher was passed through a 20 mesh (aperture: 0.84 mm) so that a large mass that had been insufficiently pulverized was removed. Subsequently, the sample was sieved on a 300 mesh (aperture: 0.055 mm), and the sample remaining on the mesh was collected as a sample for hexane extraction. Thus, fine powder that had been excessively pulverized was removed.

Next, about 15 g of the sample for hexane extraction obtained by the above-mentioned method was precisely weighed, and was loaded into an extraction thimble (No. 84, inner diameter 28 mm×total length 100 mm), followed by setting in a Soxhlet extractor. Subsequently, the sample was refluxed with 300 mL of n-hexane in a reflux amount of once per 3 to 4 minutes (70 mL/time) for 8 hours to be extracted. After that, while the resultant n-hexane extract was brought into contact with a hot water bath at 40° C. with an evaporator, n-hexane was removed. After that, the residue was vacuum-dried under room temperature for 2.5 hours, and the hexane extraction amount (ppm by mass) was calculated from the following equation by using the mass (g) of a component remaining in a recovery flask.

Hexane extraction amount (ppm by mass)=1,000,000×H/amount of sample used in extraction (H: the mass of the hexane-extracted component remaining in the recovery flask, unit: g)

<Method of Determining Polydimethylsiloxane Content>

(Example) Method of Determining Amount of Polydimethylsiloxane in Polycarbonate-Polyorganosiloxane Copolymer Obtained in Example 3

NMR apparatus: ECA-500 manufactured by JEOL RESONANCE Inc.
Probe: TH 5 corresponding to a 5 φNMR sample tube
Observation range: From −5 ppm to 15 ppm
Observation center: 5 ppm
Pulse repetition time: 9 seconds
Pulse width: 45°
Number of scans: 256 times
NMR sample tube: 5 φ
Sample amount: From 30 mg to 40 mg
Solvent: Deuterated chloroform
Measurement temperature: Room temperature
A: The integrated value of the meta position of a phenyl moiety observed at a δ of from about 7.3 to about 7.5
B: The integrated value of a methyl group of a dimethylsiloxane moiety observed at a δ of from about −0.02 to about 0.3
C: The integrated value of a methine group of an isosorbide (ISB) moiety observed at a δ of from about 4.8 to about 5.3
D: The integrated value of a methylene group of a PEG moiety observed at a δ of from about 3.3 to about 3.8
E: The integrated value of a methine group and a methylene group of a CHDM moiety observed at a δ of from about 0.8 to about 2.0
F: The integrated value of a methylene group of a dimethylsiloxane terminal moiety observed at a δ of from about 0.4 to about 0.6 a=A/2
b=B/6 c=C/3
d=D/4
e=(E−F)/10
T=a+b+c+d+e
f=a/T×100
g=b/T×100
h=c/T×100
i=d/T×100
j=e/T×100
TW=f×93+g×74.1+h×172+i×44+j×170
PDMS (wt %)=g×74.1/TW×100

<Methods of Measuring [POS-Mh] and [POS-M1]>

With regard to each of the various polycarbonate-polyorganosiloxane copolymers described in Examples and Comparative Examples described below, the average weight (wt %) of a polyorganosiloxane block in the polycarbonate-polyorganosiloxane copolymer obtained by fractionating a component corresponding to the retention time range of from T1 to T2 with a gel permeation chromatograph (GPC) was determined by the above-mentioned measurement method, and the value was adopted as [POS-Mh]. Similarly, the average weight (wt %) of a polyorganosiloxane block in the polycarbonate-polyorganosiloxane copolymer obtained by fractionating a component corresponding to the retention time range of from T2 to T3 was adopted as [POS-M1]. A GPC measurement method, and methods of determining T1, T2, and T3 are described below.

Conditions for Fractionation of Polycarbonate-polyorganosiloxane Copolymer with GPC Test instrument: A preparative GPC [SPD-M20A] manufactured by Shimadzu Corporation
Solvent: Chloroform
Columns: JAIGEL-4H and JAIGEL-2H
Column temperature: Room temperature
Flow rate: 3.8 mL/min
Detector: A $R^1$ detector
Injection concentration:
In the case of a polystyrene standard:
3 mg/mL
In the case of the polycarbonate-polyorganosiloxane copolymer:
30 mg/mL
Injection amount: 3 mL T1 to T3 were each determined from the peak top of a chromatogram obtained by subjecting the polystyrene standard to measurement with the GPC.

Polystyrene standards: The following standard polystyrenes manufactured by Tosoh Corporation were used.
F-10: Mw/Mn=1.01, Mw=98,900
F-2: Mw/Mn=1.01, Mw=13,700
A-2500: Mw/Mn=1.03, Mw=3,120

<Viscosity-Average Molecular Weight of Polycarbonate-Polyorganosiloxane Copolymer>

A viscosity-average molecular weight (Mv) was calculated from the following equation (Schnell's equation) by using a limiting viscosity [η] determined through the measurement of the viscosity of a methylene chloride solution (concentration: g/L) at 20° C. with an Ubbelohde-type viscometer.

$$[\eta]=1.23\times 10^{-5}Mv^{0.83}$$

[Evaluation Test]

<Total Light Transmittance Tt (%) and Haze Value of Resin Molded Article>

An evaluation pellet obtained in each of Examples and Comparative Examples was molded with an injection molding machine (manufactured by Niigata Machine Techno Co., Ltd., "MD50XB", screw diameter: 30 mmφ) at a cylinder temperature of 240° C. and a mold temperature of 80° C. into a three-stage plate for a transparency evaluation (90 mm×50 mm, 3-millimeter thick portion: 45 mm×50 mm, 2-millimeter thick portion: 22.5 mm×50 mm, 1-millimeter thick portion: 22.5 mm×50 mm). The total light transmittance of the 1-millimeter thick portion of the three-stage plate was measured in conformity with ISO 13468-1:1996. The haze value of the 1-millimeter thick portion of the same sample was measured in conformity with ISO 14782:1999. Both the values were measured by using NDH 5000 manufactured by Nippon Denshoku Industries Co., Ltd. as a measuring apparatus.

A smaller haze value means that the transparency of the sample is higher.

$$Haze=Td/Tt\times 100$$

wherein Td represents the diffuse transmittance of the sample, and Tt represents the total light transmittance thereof.

<Total Light Transmittance (%) and Haze Value of Raw Material Mixture>

The total light transmittance and haze value of a raw material mixture were determined by using the following measuring apparatus, glass cell, and measurement method.

Measuring apparatus: NDH 5000 manufactured by Nippon Denshoku Industries Co., Ltd.
Glass cell: Optical path length: 10 mm
Dimensions: External dimensions measuring 14 mm (length)×40 mm (width)×55 mm (height)
Glass thickness of each surface:
2 mm Prior to the measurement of the haze of the raw material mixture, zero-point adjustment was performed by filling the glass cell with pure water. Specifically, the adjustment was performed so that the following states were established: the measured value of a total light transmittance in a state in which the cell was filled with the pure water became 100%; and the measured value of a haze value in the state became 0.00. Next, the pure water was removed from the glass cell, and the cell was filled with a liquid mixture obtained by a method to be described later and subjected to measurement, followed by the determination of the haze value of the mixture at 23° C. in conformity with ISO 14782:1999.

$$Haze=Td/Tt\times 100$$

wherein Td represents the diffuse transmittance of the mixture, and Tt represents the total light transmittance thereof.

Production Example 1: Production of PDMS-1

Under a nitrogen atmosphere, to a polyorganosiloxane (100 g) having a siloxane average chain length of 24, which was represented by the following formula:

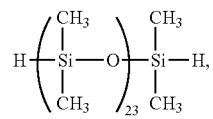

a polyethylene glycol having an average oxyethylene chain length of 15, which was represented by the following formula:

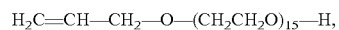

was added in a molar amount (82.3 g) twice as large as that of the polyorganosiloxane. 455 Grams (2.5 parts with respect to the total mass of the polyorganosiloxane and the polyethylene glycol) of isopropyl alcohol was added to the materials, and then the mixture was sufficiently stirred while its temperature was controlled to 80° C. Next, a solution of a vinylsiloxane complex of platinum in toluene was added to the mixture in such an amount that the mass of a platinum atom became 5 ppm by mass with respect to the siloxane, followed by stirring for 10 hours. Isopropyl alcohol and the platinum catalyst were removed from the resultant mixture. Thus, a polyether-modified polyorganosiloxane PDMS-1 was obtained.

Production Example 2: Production of PDMS-2

Production was performed in the same manner as in Production Example 1 except that an α,ω-dihydrogen organopolysiloxane having an average siloxane chain length of 61 was used.

Production Example 3: Production of PDMS-3

Production was performed in the same manner as in Production Example 1 except that an α,ω-dihydrogen organopolysiloxane having an average siloxane chain length of 88 was used.

Production Example 4: Production of PDMS-4

Production was performed in the same manner as in Production Example 1 except that the average oxyethylene chain length of the polyethylene glycol to be used was set to 12.

Production Example 5: Production of PDMS-5

Under a nitrogen atmosphere, to a polyorganosiloxane having an average siloxane chain length of 39, which was represented by the following formula:

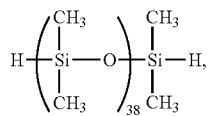

2-allylphenol was added in a molar amount twice as large as that of the polyorganosiloxane. The mixture was sufficiently stirred while its temperature was controlled to 100° C. Next, a solution of a vinylsiloxane complex of platinum in toluene was added to the mixture in such an amount that the mass of a platinum atom became 5 ppm by mass with respect to the siloxane, followed by stirring for 10 hours. Isopropyl alcohol and the platinum catalyst were removed from the resultant mixture. Thus, an allylphenol-modified polyorganosiloxane PDMS-5 was obtained.

Production Example 6: Production of PDMS-6

Production was performed in the same manner as in Production Example 5 except that eugenol was used instead of 2-allylphenol.

Production Example 7: Production of PDMS-7

Production was performed in the same manner as in Production Example 1 except that ethylene glycol monoallyl ether ($CH_2=CHCH_2$—O—$CH_2CH_2$—OH) was used instead of the polyethylene glycol.

Production Example 8: Production of PDMS-8

Production was performed in the same manner as in Production Example 1 except that: the siloxane average chain length of the polyorganosiloxane to be used was set to 45; the average oxyethylene chain length of the polyethylene glycol to be used was set to 8; toluene was used as a solvent; and the reaction temperature was set to 110° C.

Production Example 9: Production of PDMS-9

Production was performed in the same manner as in Production Example 8 except that: the average oxyethylene chain length of the polyethylene glycol to be used was set to 38; toluene was used as a solvent; and the reaction temperature was set to 110° C.

Production Example 10: Production of PDMS-10

Production was performed in the same manner as in Production Example 1 except that: the siloxane average chain length of the polyorganosiloxane to be used was set to 5; toluene was used as a solvent; and the reaction temperature was set to 110° C.

Production Example 11: Production of PDMS-11

Under a nitrogen atmosphere, 350 mL of methylene chloride was loaded into a flask, and 21.5 g of 2,6-di-t-butylpyridine and 21 g of trifluoromethanesulfonic anhydride were loaded into the flask, followed by the cooling of the mixture to 15° C. or less. 4.3 Grams of allyl alcohol was dropped into the mixture to form a reaction initiator. After the initiator had been stirred for about 15 minutes, 1 L of dehydrated tetrahydrofuran was loaded into the initiator, and the mixture was stirred at from 20° C. to 23° C. for 5 minutes. After that, 30 mL of ion-exchanged water was loaded into the mixture to terminate the reaction. The resultant was extracted with heptane and washed with 10% hydrochloric acid, followed by the separation of an aqueous phase. After that, the residue was subsequently washed with ion-exchanged water twice, and an aqueous phase was separated. After that, the solvent was evaporated under a decompressed condition. Thus, 120 g of a one-terminal allyl-modified polytetramethylene glycol (chain length of its tetramethylene glycol moiety=20) represented by the following formula was obtained.

Production was performed in the same manner as in Production Example 8 except that: the one-terminal allyl-modified polytetramethylene glycol obtained by the above-mentioned reaction was used instead of the polyethylene glycol; the solvent was changed to a mixed liquid containing toluene and isopropanol at 1:1 (mass ratio), and the usage amount of the solvent was set to a volume amount three times as large as the total volume of the polyorganosiloxane and the one-terminal allyl-modified polytetramethylene glycol; and the reaction temperature was controlled to from 80° C. to 90° C.

Production Example 12: Production of PDMS-12

A polydimethylsiloxane having —$C_3H_6OC_2H_4OH$ groups at both of its terminals (average chain number of a SiMe$_2$O unit: 40) and trimethylene carbonate whose molar amount was 25 times as large as that of the hydroxyl groups of the above-mentioned polyorganosiloxane were loaded into a flask under a nitrogen atmosphere, and dehydrated dichloromethane was loaded into the flask so that the concentration of the raw materials became 10 wt %. 3 Equivalents of 1,8-diazabicycloundecene with respect to the terminal OH groups of the polydimethylsiloxane was loaded as a catalyst into the resultant transparent reaction solution, and the mixture was subjected as it was to a reaction under room temperature for 48 hours. After that, benzoic acid was added to terminate the reaction, and the resultant reaction mixture was reprecipitated in a mixed solvent formed of a mixed liquid containing methanol, 2-propanol, and hexane (at a volume ratio of 10:1:10). The resultant precipitate was vacuum-dried to provide a PDMS-12 (chain number of polytrimethylene carbonate at each terminal: 18).

Production Example 13: Production of PDMS-13

Under a nitrogen atmosphere, 450 mL of methylene chloride was loaded into a flask, and 45.0 g of 3-iodo-1-propanol was added to the flask, followed by the cooling of the mixture with an ice bath. 40.1 Grams of tert-butyldimethylchlorosilane was added to the mixture, and the whole was stirred under room temperature for 20 hours. The resultant mixture was quenched with a 5% aqueous solution of sodium hydrogen carbonate, and the product was extracted with an ethyl acetate/ion-exchanged water system. The resultant product was purified with a silica gel column to provide the TBS-protected form of 3-iodo-1-propanol (yield: 67.7 g).

Under a nitrogen atmosphere, 2.9 g of the above-mentioned TBS-protected form of 3-iodo-1-propanol and 270 mL of tetrahydrofuran were mixed in a flask, and the mixture was cooled to −65° C. or less. 12.5 Milliliters of 1.6 mol/L tert-butyllithium (pentane solution) was dropped into the mixture, and the whole was stirred as it was for 15 minutes. 2.5 Milliliters of diphenylethylene was dropped into the resultant, and the mixture was stirred as it was for 30 minutes. After that, 55 mL of a 0.52 mol/L solution of lithium chloride in THF was loaded into the mixture, and the whole was stirred for 10 minutes. Next, 10.1 mL of methyl methacrylate was loaded into the resultant, and the mixture was stirred for 10 minutes. Next, 3.36 mL of allyl bromide was loaded to quench the reaction, and then the contents in the flask were mixed at room temperature for 12 hours. The resultant reaction mixture was concentrated under reduced pressure, and then the concentrate was reprecipitated in a THF/heptane system. After that, the precipitate was purified with a silica gel column so that the solvent was removed. Thus, the TBS-protected form of a one-terminal allyl-modified polymethyl methacrylate (PMMA) was obtained. The product was dissolved in THF, and was deprotected with a 2 mol/L aqueous solution of hydrochloric acid. The resultant reaction mixture was loaded into heptane so that a target product (deprotected form) was separated. The deprotected form was purified with a silica gel column so that the solvent was removed. Thus, the one-terminal allyl-modified PMMA (chain number of its PMMA moiety=20) represented by the following formula was obtained.

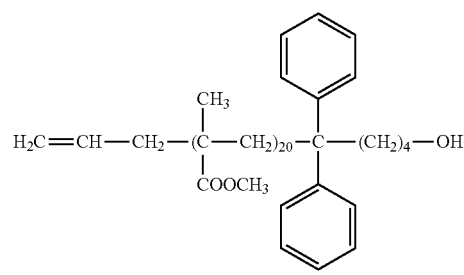

Production was performed in the same manner as in Production Example 8 except that the above-mentioned one-terminal allyl-modified PMMA was used instead of the polyethylene glycol.

Production Example 14: Production of PDMS-14

Production was performed in the same manner as in Production Example 1 except that a polypropylene glycol having an average oxypropylene chain length of 15, which was represented by the following formula:

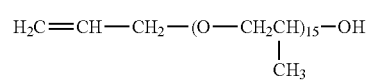

was used instead of the polyethylene glycol.

The PDMS-1 to the PDMS-14 obtained in Production Examples 1 to 14 are shown in Table 1.

TABLE 1

| | |
|---|---|
| Production Example 1 | H—(OCH$_2$CH$_2$)$_{15}$—O—CH$_2$—CH$_2$—CH$_2$—(Si(CH$_3$)$_2$—O)$_{23}$—Si(CH$_3$)$_2$—CH$_2$—CH$_2$—CH$_2$—O—(CH$_2$CH$_2$O)$_{15}$—H |
| Production Example 2 | H—(OCH$_2$CH$_2$)$_{15}$—O—CH$_2$—CH$_2$—CH$_2$—(Si(CH$_3$)$_2$—O)$_{60}$—Si(CH$_3$)$_2$—CH$_2$—CH$_2$—CH$_2$—O—(CH$_2$CH$_2$O)$_{15}$—H |
| Production Example 3 | H—(OCH$_2$CH$_2$)$_{15}$—O—CH$_2$—CH$_2$—CH$_2$—(Si(CH$_3$)$_2$—O)$_{87}$—Si(CH$_3$)$_2$—CH$_2$—CH$_2$—CH$_2$—O—(CH$_2$CH$_2$O)$_{15}$—H |

TABLE 1-continued
| Production Example 4 | 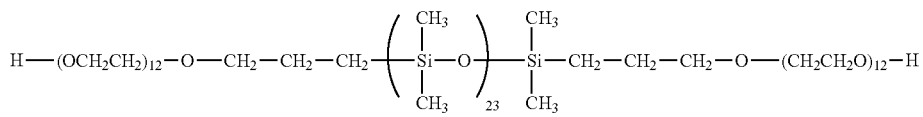 |
| Production Example 5 | 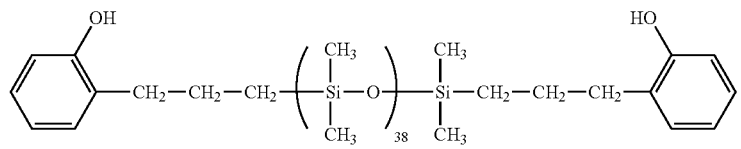 |
| Production Example 6 | 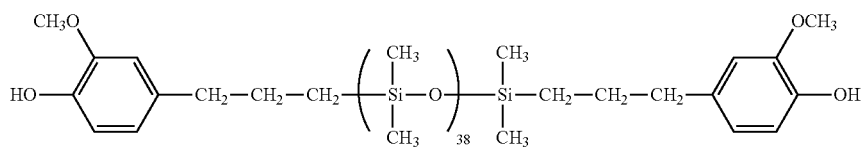 |
| Production Example 7 | 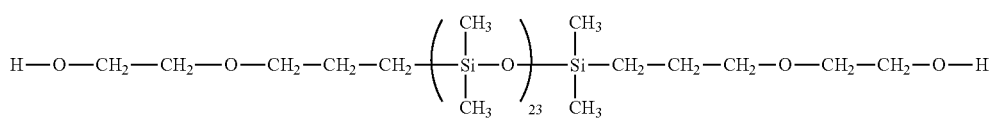 |
| Production Example 8 | 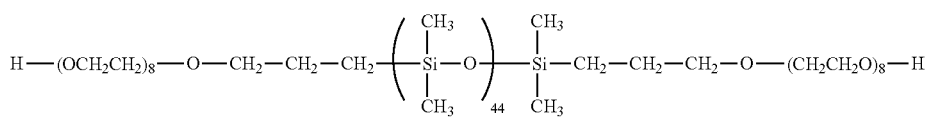 |
| Production Example 9 | 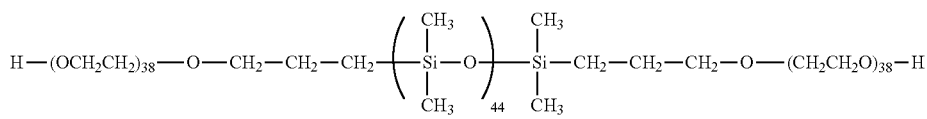 |
| Production Example 10 | 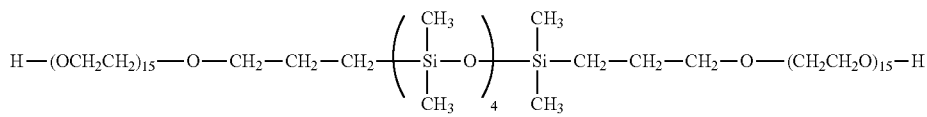 |
| Production Example 11 | 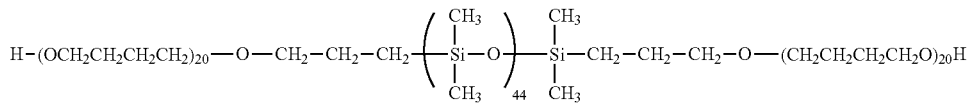 |
| Production Example 12 | 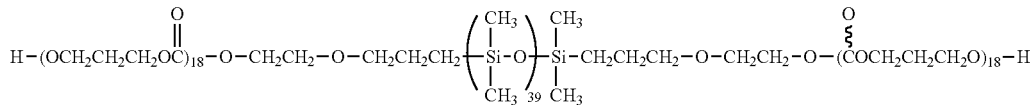 |
| Production Example 13 | 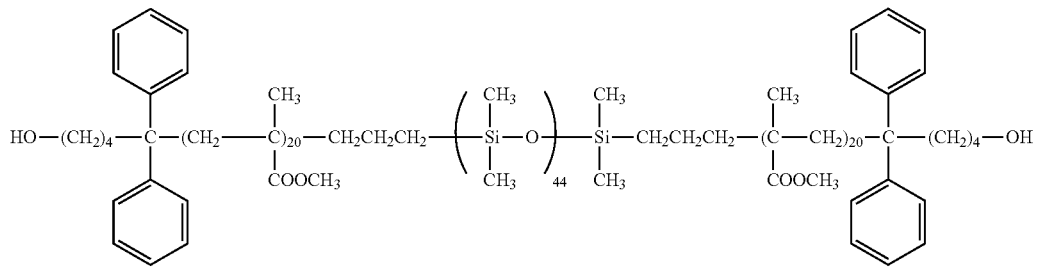 |
| Production Example 14 | 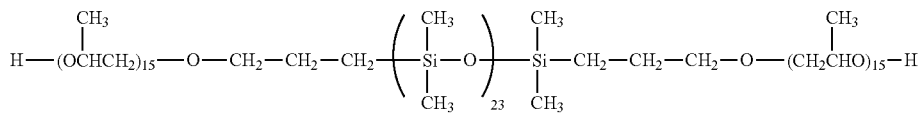 |

[Others]
   BisP-A: bisphenol A [manufactured by Idemitsu Kosan Co., Ltd.]
   1,4-CHDM: 1,4-cyclohexanedimethanol [manufactured by Tokyo Chemical Industry Co., Ltd.]
   TCDDM: tricyclodecanedimethanol [manufactured by OXEA GmbH]
   1,3-PG: 1,3-propanediol [manufactured by Tokyo Chemical Industry Co., Ltd.]
   PEG 400: polyethylene glycol 400 [average molecular weight: 380 g/mol to 420 g/mol, manufactured by Tokyo Chemical Industry Co., Ltd.]
   DPC: diphenyl carbonate [manufactured by Mitsui Fine Chemicals, Inc.]
   0.01 N sodium hydroxide aqueous solution [manufactured by Fujifilm Wako Pure Chemical Corporation]

Example 1

<Evaluation of Transparency of Raw Material Mixture after its Heating Treatment>

BisP-A (2,489.9 g) and DPC (2,500 g) (molar ratio between the respective raw materials: BisP-A/DPC=100/107), and 28.2 g of the polyether-modified polyorganosiloxane PDMS-1 were loaded into a 10-liter stainless steel-made reactor including a double helical blade as a stirring apparatus. Those raw material monomers were completely melted at 150° C., and then the stirring of the molten product was started at 70 rpm, followed by the purging of air in the reactor with nitrogen. Next, 1.64 mL (amount $1.5 \times 10^{-6}$ times as large as the number of moles of the entire diol monomer) of 0.01 N sodium hydroxide was loaded as a catalyst into the reactor. While the pressure of nitrogen was held at 101 kPa equal to atmospheric pressure, the temperature of the mixture was increased to 200° C., and the temperature was held for 60 minutes. Subsequently, the contents were extracted from a valve in the bottom portion of the reactor to provide a liquid and transparent raw material mixture. The liquid raw material mixture after its heating treatment had a total light transmittance of 98.4% and a haze value of 0.5, and hence showed high transparency.

<Production of Polycarbonate-Polyorganosiloxane (PC-POS) Copolymer>

A polycarbonate-polyorganosiloxane copolymer was produced by using the following raw materials under the following conditions. The same raw materials as those subjected to the transparency evaluation are used as the raw materials, and their polymerization conditions are as described below.

BisP-A (2,489.9 g) serving as a diol monomer and DPC (2,500 g) (molar ratio between the respective raw materials: BisP-A/DPC=100/107), and 28.2 g of the polyether-modified polyorganosiloxane PDMS-1 were loaded into a 10-liter stainless steel-made reactor including a stirring apparatus, a trap configured to trap distilled phenol, and a decompression apparatus, and these raw material monomers were completely melted at 150° C., followed by the purging of air in the reactor with nitrogen. 1.64 Milliliters (amount $1.5 \times 10^{-6}$ times as large as the number of moles of the entire diol monomer) of 0.01 N sodium hydroxide was loaded as a catalyst into the reactor to initiate polymerization. A temperature in the reactor was increased to 180° C., and the reactor was decompressed to a decompression degree of 200 mmHg (26.6 kPa), over about 60 minutes, and the reaction conditions were held until the amount of phenol to be distilled out became 0.2 L. After that, the temperature in the reactor was increased to 200° C., and the reactor was decompressed to a decompression degree of 10 mmHg (1.3 kPa), over about 60 minutes, and the conditions were held until 1.0 L of phenol was distilled out.

Next, the temperature in the reactor was increased to 240° C. over about 120 minutes, and the condition was held until 1.5 L of phenol was distilled out. Subsequently, the temperature and the decompression degree in the reactor were adjusted to 280° C. and 1 mmHg (0.1 kPa) or less, respectively over about 120 minutes. Two liters or more of phenol was distilled out, and the reaction was continued until a predetermined stirring torque was obtained. After that, the pressure in the reactor was returned to atmospheric pressure with nitrogen, and 0.037 g (amount 10 times as large as the number of moles of NaOH) of butyl p-toluenesulfonate was loaded as a deactivator into the reactor. Each of Irganox 1010 and Irgafos 168 was loaded into the reactor so that its content in a polymer to be obtained became 1,500 ppm, followed by sufficient stirring. After that, a resin strand was extracted from the bottom portion of the reactor with the pressure of nitrogen, and the strand was cut with a pelletizer to provide a pellet-shaped polycarbonate-polyorganosiloxane copolymer having high transparency. The results of the evaluations of the resultant polycarbonate-polyorganosiloxane copolymer are shown in Table 2.

Example 2

The transparency of a raw material mixture after its heating treatment was evaluated in the same manner as in Example 1 except that BisP-A (1,293.3 g) and 1,4-CHDM (817.0 g) serving as diol monomers, and DPC (2,500 g) (molar ratio among the respective raw materials: BisP-A/1,4-CHDM/DPC=50/50/103), and 24.4 g of the polyether-modified polyorganosiloxane PDMS-1 were used. The liquid raw material mixture after the heating treatment had high transparency, and had a total light transmittance of 98.5% and a haze value of 0.5.

Polymerization was performed under the same conditions as those of Example 1 except that BisP-A (1,293.3 g) and 1,4-CHDM (817.0 g) serving as diol monomers, and DPC (2,500 g) (molar ratio among the respective raw materials: BisP-A/1,4-CHDM/DPC=50/50/103), and 24.4 g of the polyether-modified polyorganosiloxane PDMS-1 were used. Thus, a pellet-shaped polycarbonate-polyorganosiloxane copolymer having high transparency was obtained. The results of the evaluations of the resultant polycarbonate-polyorganosiloxane copolymer are shown in Table 2.

Example 3

<Evaluation of Transparency of Raw Material Mixture after its Heating Treatment>

The heating treatment of raw materials was performed in the same manner as in Example 1 except that isosorbide (ISB) (1,193.8 g), 1,4-CHDM (504.9 g), and DPC (2,500 g) (molar ratio among the respective raw materials: ISB/1,4-CHDM/DPC=70:30:100), and 20.2 g of the polyether-modified polyorganosiloxane PDMS-1 were used. The liquid raw material mixture after the heating treatment had high transparency, and had a total light transmittance of 99.5% and a haze value of 0.4.

<Production of PC-POS Copolymer>

ISB (1,193.8 g) and 1,4-CHDM (504.9 g) serving as diol monomers, and DPC (2,500 g) (molar ratio among the respective raw materials: ISB/1,4-CHDM/DPC=70:30:100), and 20.2 g of the polyether-modified polyorganosiloxane PDMS-1 were loaded into a 10-liter stainless steel-made reactor including a stirring apparatus, a trap configured to trap distilled phenol, and a decompression apparatus, and these raw material monomers were completely melted at 100° C., followed by the purging of air in the reactor with nitrogen. 1.64 Milliliters (amount $1.5 \times 10^{-6}$ times as large as the number of moles of all the diol monomers) of 0.01 N sodium hydroxide was loaded as a catalyst into the reactor to initiate polymerization. A temperature in the reactor was increased to 180° C., and the reactor was decompressed to a decompression degree of 200 mmHg (26.6 kPa), over from about 50 minutes to about 100 minutes, and the conditions were held until the amount of phenol to be distilled out became 0.2 L. After that, the temperature in the reactor was increased to 200° C., and the reactor was decompressed to a decompression degree of 10 mmHg (1.3 kPa), over about 150 minutes, and the conditions were held until 1.8 L of phenol was distilled out.

Next, the temperature and the decompression degree in the reactor were adjusted to 220° C. and 1 mmHg (0.1 kPa) or less, respectively over about 60 minutes. Two liters or more of phenol was distilled out, and the reaction was continued until a predetermined stirring torque was obtained. After that, the pressure in the reactor was returned to atmospheric pressure with nitrogen, and 0.037 g (amount 10 times as large as the number of moles of NaOH) of butyl p-toluenesulfonate was loaded as a deactivator into the reactor. Each of Irganox 1010 and Irgafos 168 was loaded into the reactor so that its content in a polymer to be obtained became 1,500 ppm, followed by sufficient stirring. After that, a resin strand was extracted from the bottom portion of the reactor with the pressure of nitrogen, and the strand was cut with a pelletizer to provide a pellet-shaped polycarbonate-polyorganosiloxane copolymer having high transparency. The results of the evaluations of the resultant polycarbonate-polyorganosiloxane copolymer are shown in Table 2.

Example 4

The transparency of a raw material mixture after its heating treatment was evaluated in the same manner as in Example 3 except that 20.2 g of the PDMS-2 was used as a polyorganosiloxane. The liquid raw material mixture after the heating treatment had high transparency, and had a total light transmittance of 98.4% and a haze value of 0.8.

Polymerization was performed under the same conditions as those of Example 3 except that 20.2 g of the PDMS-2 was used as a polyorganosiloxane. Thus, a pellet-shaped polycarbonate-polyorganosiloxane copolymer having high transparency was obtained. The results of the evaluations of the resultant polycarbonate-polyorganosiloxane copolymer are shown in Table 2.

Example 5

The transparency of a raw material mixture after its heating treatment was evaluated in the same manner as in Example 3 except that 20.2 g of the PDMS-3 was used as a polyorganosiloxane. The liquid raw material mixture after the heating treatment had high transparency, and had a total light transmittance of 98.1% and a haze value of 1.3.

Polymerization was performed under the same conditions as those of Example 3 except that 20.2 g of the PDMS-3 was used as a polyorganosiloxane. Thus, a pellet-shaped polycarbonate-polyorganosiloxane copolymer having high transparency was obtained. The results of the evaluations of the resultant polycarbonate-polyorganosiloxane copolymer are shown in Table 2.

Example 6

The transparency of a raw material mixture after its heating treatment was evaluated in the same manner as in Example 3 except that 20.2 g of the PDMS-4 was used as a polyorganosiloxane. The liquid raw material mixture after the heating treatment had high transparency, and had a total light transmittance of 97.9% and a haze value of 0.7.

Polymerization was performed under the same conditions as those of Example 3 except that 20.2 g of the PDMS-4 was used as a polyorganosiloxane. Thus, a pellet-shaped polycarbonate-polyorganosiloxane copolymer having high transparency was obtained. The results of the evaluations of the resultant polycarbonate-polyorganosiloxane copolymer are shown in Table 2.

Example 7

The transparency of a raw material mixture after its heating treatment was evaluated in the same manner as in Example 3 except that 105.4 g of the PDMS-1 was used as a polyorganosiloxane. The liquid raw material mixture after the heating treatment had high transparency, and had a total light transmittance of 97.5% and a haze value of 0.9.

Polymerization was performed under the same conditions as those of Example 3 except that 105.4 g of the PDMS-1 was used as a polyorganosiloxane. Thus, a pellet-shaped polycarbonate-polyorganosiloxane copolymer having high transparency was obtained. The results of the evaluations of the resultant polycarbonate-polyorganosiloxane copolymer are shown in Table 2.

Example 8

The transparency of a raw material mixture after its heating treatment was evaluated in the same manner as in Example 3 except that 222.5 g of the PDMS-1 was used as a polyorganosiloxane. The liquid raw material mixture after the heating treatment had high transparency, and had a total light transmittance of 97.1% and a haze value of 1.1.

Polymerization was performed under the same conditions as those of Example 3 except that 222.5 g of the PDMS-1 was used as a polyorganosiloxane. Thus, a pellet-shaped polycarbonate-polyorganosiloxane copolymer having high transparency was obtained. The results of the evaluations of the resultant polycarbonate-polyorganosiloxane copolymer are shown in Table 2.

Example 9

The transparency of a raw material mixture after its heating treatment was evaluated in the same manner as in Example 3 except that ISB (1,193.8 g) and TCDDM (687.2 g) serving as diol monomers, and DPC (2,500 g) (molar ratio among the respective raw materials: ISB/TCDDM/DPC=70:30:100), and 22.1 g of the polyether-modified polyorganosiloxane PDMS-1 were used. The liquid raw material mixture after the heating treatment had high transparency, and had a total light transmittance of 98.5% and a haze value of 0.4.

Polymerization was performed under the same conditions as those of Example 3 except that ISB (1,193.8 g) and TCDDM (687.2 g) serving as diol monomers, and DPC (2,500 g) (molar ratio among the respective raw materials: ISB/TCDDM/DPC=70:30:100), and 22.1 g of the polyether-modified polyorganosiloxane PDMS-1 were used. Thus, a pellet-shaped polycarbonate-polyorganosiloxane copolymer having high transparency was obtained. The results of the evaluations of the resultant polycarbonate-polyorganosiloxane copolymer are shown in Table 2.

Example 10

The transparency of a raw material mixture after its heating treatment was evaluated in the same manner as in Example 3 except that ISB (1,193.8 g), 1,4-CHDM (420.7 g), and 1,3-PG (44.4 g) serving as diol monomers, and DPC (2,500 g) (molar ratio among the respective raw materials: ISB/1,4-CHDM/1,3-PG/DPC=70:25:5:100), and 19.8 g of the polyether-modified polyorganosiloxane PDMS-1 were used. The liquid raw material mixture after the heating treatment had high transparency, and had a total light transmittance of 98.3% and a haze value of 0.4.

Polymerization was performed under the same conditions as those of Example 3 except that ISB (1,193.8 g), 1,4-CHDM (420.7 g), and 1,3-PG (44.4 g) serving as diol monomers, and DPC (2,500 g) (molar ratio among the respective raw materials: ISB/1,4-CHDM/1,3-PG/DPC=70:25:5:100), and 19.8 g of the polyether-modified polyorganosiloxane PDMS-1 were used. Thus, a pellet-shaped polycarbonate-polyorganosiloxane copolymer having high transparency was obtained. The results of the evaluations of the resultant polycarbonate-polyorganosiloxane copolymer are shown in Table 2.

Example 11

The transparency of a raw material mixture after its heating treatment was evaluated in the same manner as in Example 3 except that ISB (1,193.8 g), 1,4-CHDM (504.9 g), and PEG 400 (93.4 g) serving as diol monomers, and DPC (2,500 g) [molar ratio among the respective raw materials: ISB/1,4-CHDM/PEG 400/DPC=70:28:2:100 (a value obtained by dividing the used mass of the PEG 400 by its average molecular weight, that is, 400 was used as the number of moles thereof)], and 21.3 g of the polyether-modified polyorganosiloxane PDMS-1 were used. The liquid raw material mixture after the heating treatment had high transparency, and had a total light transmittance of 98.3% and a haze value of 0.4.

Polymerization was performed under the same conditions as those of Example 3 except that ISB (1,193.8 g), 1,4-CHDM (504.9 g), and PEG 400 (93.4 g) serving as diol monomers, and DPC (2,500 g) [molar ratio among the respective raw materials: ISB/1,4-CHDM/PEG 400/DPC=70:28:2:100 (a value obtained by dividing the used mass of the PEG 400 by its average molecular weight, that is, 400 was used as the number of moles thereof)], and 21.3 g of the polyether-modified polyorganosiloxane PDMS-1 were used. Thus, a pellet-shaped polycarbonate-polyorganosiloxane copolymer having high transparency was obtained. The results of the evaluations of the resultant polycarbonate-polyorganosiloxane copolymer are shown in Table 2.

Example 12

<Evaluation of Transparency of Raw Material Mixture after its Heating Treatment>

The transparency of a raw material mixture after its heating treatment was evaluated in the same manner as in Example 1 except that 179.7 g of the PDMS-8 was used as a polyorganosiloxane. The liquid raw material mixture after the heating treatment had high transparency, and had a total light transmittance of 90.8% and a haze value of 2.5.

<Production of PC-POS Copolymer>

Polymerization was performed under the same conditions as those of Example 1 except that 179.7 g of the PDMS-8 was used as a polyorganosiloxane. Thus, a pellet-shaped polycarbonate-polyorganosiloxane copolymer having high transparency was obtained. The resultant polycarbonate-polyorganosiloxane copolymer had a viscosity-average molecular weight of 20,100, a polydimethylsiloxane content of 5.00 mass %, a total light transmittance of 33.7%, a haze value of 97.0, a hexane-extracted component amount of 653 ppm, a ratio [POS-Mh]/[POS-M1] of 1.47, and a Charpy impact strength (with a notch) of 81.0 kJ/m$^2$.

Example 13

<Evaluation of Transparency of Raw Material Mixture after its Heating Treatment>

The transparency of a raw material mixture after its heating treatment was evaluated in the same manner as in Example 1 except that 312.8 g of the PDMS-8 was used as a polyorganosiloxane. The liquid raw material mixture after the heating treatment had high transparency, and had a total light transmittance of 89.1% and a haze value of 2.6.

<Production of PC-POS Copolymer>

Polymerization was performed under the same conditions as those of Example 1 except that 312.8 g of the PDMS-8 was used as a polyorganosiloxane. Thus, a pellet-shaped polycarbonate-polyorganosiloxane copolymer having high transparency was obtained. The resultant polycarbonate-polyorganosiloxane copolymer had a viscosity-average molecular weight of 20,100, a polydimethylsiloxane content of 8.30 mass %, a total light transmittance of 28.3%, a haze value of 98.1, a hexane-extracted component amount of 714 ppm, a ratio [POS-Mh]/[POS-M1] of 1.23, and a Charpy impact strength (with a notch) of 85.0 kJ/m$^2$.

Example 14

<Evaluation of Transparency of Raw Material Mixture after its Heating Treatment>

The transparency of a raw material mixture after its heating treatment was evaluated in the same manner as in Example 1 except that 179.7 g of the PDMS-9 was used as a polyorganosiloxane. The liquid raw material mixture after the heating treatment had high transparency, and had a total light transmittance of 90.1% and a haze value of 2.0.

<Production of PC-POS Copolymer>

Polymerization was performed under the same conditions as those of Example 1 except that 179.7 g of the PDMS-9 was used as a polyorganosiloxane. Thus, a pellet-shaped polycarbonate-polyorganosiloxane copolymer having high transparency was obtained. The resultant polycarbonate-polyorganosiloxane copolymer had a viscosity-average molecular weight of 20,000, a polydimethylsiloxane content of 3.10 mass %, a total light transmittance of 62.0%, a haze value of 89.4, a hexane-extracted component amount of 663 ppm, a ratio [POS-Mh]/[POS-M1] of 1.13, and a Charpy impact strength (with a notch) of 75.0 kJ/m$^2$.

Example 15

<Evaluation of Transparency of Raw Material Mixture after its Heating Treatment>

The transparency of a raw material mixture after its heating treatment was evaluated in the same manner as in Example 1 except that 179.7 g of the PDMS-10 was used as a polyorganosiloxane. The liquid raw material mixture after the heating treatment had high transparency, and had a total light transmittance of 91.0% and a haze value of 1.3.
<Production of PC-POS Copolymer>

Polymerization was performed under the same conditions as those of Example 1 except that 179.7 g of the PDMS-10 was used as a polyorganosiloxane. Thus, a pellet-shaped polycarbonate-polyorganosiloxane copolymer having high transparency was obtained. The resultant polycarbonate-polyorganosiloxane copolymer had a viscosity-average molecular weight of 20,150, a polydimethylsiloxane content of 0.90 mass %, a total light transmittance of 86.1%, a haze value of 6.8, a hexane-extracted component amount of 585 ppm, a ratio [POS-Mh]/[POS-M1] of 1.09, and a Charpy impact strength (with a notch) of 76.0 kJ/m$^2$.

Example 16

<Evaluation of Transparency of Raw Material Mixture after its Heating Treatment>

The transparency of a raw material mixture after its heating treatment was evaluated in the same manner as in Example 1 except that 28.2 g of the PDMS-11 was used as a polyorganosiloxane. The liquid raw material mixture after the heating treatment had high transparency, and had a total light transmittance of 89.9% and a haze value of 7.3.
<Production of PC-POS Copolymer>

Polymerization was performed under the same conditions as those of Example 1 except that 28.2 g of the PDMS-11 was used as a polyorganosiloxane. Thus, a pellet-shaped polycarbonate-polyorganosiloxane copolymer having high transparency was obtained. The resultant polycarbonate-polyorganosiloxane copolymer had a viscosity-average molecular weight of 20,200, a polydimethylsiloxane content of 0.53 mass %, a total light transmittance of 65.1%, a haze value of 83.5, a hexane-extracted component amount of 83 ppm, and a ratio [POS-Mh]/[POS-M1] of 1.20.

Example 17

<Evaluation of Transparency of Raw Material Mixture after its Heating Treatment>

The transparency of a raw material mixture after its heating treatment was evaluated in the same manner as in Example 1 except that 57.1 g of the PDMS-11 was used as a polyorganosiloxane. The liquid raw material mixture after the heating treatment had high transparency, and had a total light transmittance of 78.6% and a haze value of 12.0.
<Production of PC-POS Copolymer>

Polymerization was performed under the same conditions as those of Example 1 except that 57.1 g of the PDMS-11 was used as a polyorganosiloxane. Thus, a pellet-shaped polycarbonate-polyorganosiloxane copolymer having high transparency was obtained. The resultant polycarbonate-polyorganosiloxane copolymer had a viscosity-average molecular weight of 20,100, a polydimethylsiloxane content of 1.10 mass %, a total light transmittance of 48.1%, a haze value of 87.5, a hexane-extracted component amount of 143 ppm, and a ratio [POS-Mh]/[POS-M1] of 1.23.

Example 18

<Evaluation of Transparency of Raw Material Mixture after its Heating Treatment>

The transparency of a raw material mixture after its heating treatment was evaluated in the same manner as in Example 1 except that 28.2 g of the PDMS-12 was used as a polyorganosiloxane. The liquid raw material mixture after the heating treatment had high transparency, and had a total light transmittance of 97.9% and a haze value of 0.9.
<Production of PC-POS Copolymer>

Polymerization was performed under the same conditions as those of Example 1 except that 28.2 g of the PDMS-12 was used as a polyorganosiloxane. Thus, a pellet-shaped polycarbonate-polyorganosiloxane copolymer having high transparency was obtained. The resultant polycarbonate-polyorganosiloxane copolymer had a viscosity-average molecular weight of 19,900, a polydimethylsiloxane content of 0.45 mass %, a total light transmittance of 81.0%, a haze value of 11.3, a hexane-extracted component amount of 49 ppm, and a ratio [POS-Mh]/[POS-M1] of 1.20.

Example 19

<Evaluation of Transparency of Raw Material Mixture after its Heating Treatment>

The transparency of a raw material mixture after its heating treatment was evaluated in the same manner as in Example 1 except that 179.7 g of the PDMS-12 was used as a polyorganosiloxane. The liquid raw material mixture after the heating treatment had high transparency, and had a total light transmittance of 91.3% and a haze value of 2.1.
<Production of PC-POS Copolymer>

Polymerization was performed under the same conditions as those of Example 1 except that 179.7 g of the PDMS-12 was used as a polyorganosiloxane. Thus, a pellet-shaped polycarbonate-polyorganosiloxane copolymer having high transparency was obtained. The resultant polycarbonate-polyorganosiloxane copolymer had a viscosity-average molecular weight of 20,100, a polydimethylsiloxane content of 2.70 mass %, a total light transmittance of 61.0%, a haze value of 82.1, a hexane-extracted component amount of 550 ppm, and a ratio [POS-Mh]/[POS-M1] of 1.41.

Example 20

<Evaluation of Transparency of Raw Material Mixture after its Heating Treatment>

The transparency of a raw material mixture after its heating treatment was evaluated in the same manner as in Example 1 except that 28.2 g of the PDMS-13 was used as a polyorganosiloxane. The liquid raw material mixture after the heating treatment had high transparency, and had a total light transmittance of 91.5% and a haze value of 8.5.
<Production of PC-POS Copolymer>

Polymerization was performed under the same conditions as those of Example 1 except that 28.2 g of the PDMS-13 was used as a polyorganosiloxane. Thus, a pellet-shaped polycarbonate-polyorganosiloxane copolymer having high transparency was obtained. The resultant polycarbonate-polyorganosiloxane copolymer had a viscosity-average molecular weight of 20,050, a polydimethylsiloxane content of 0.42 mass %, a total light transmittance of 63.5%, a haze value of 81.2, a hexane-extracted component amount of 75 ppm, and a ratio [POS-Mh]/[POS-M1] of 1.22.

Example 21

<Evaluation of Transparency of Raw Material Mixture after its Heating Treatment>

The transparency of a raw material mixture after its heating treatment was evaluated in the same manner as in Example 3 except that 20.2 g of the PDMS-14 was used as a polyorganosiloxane. The liquid raw material mixture after the heating treatment had high transparency, and had a total light transmittance of 98.1% and a haze value of 1.0.

<Production of PC-POS Copolymer>

Polymerization was performed under the same conditions as those of Example 2 except that 20.2 g of the PDMS-14 was used as a polyorganosiloxane. Thus, a pellet-shaped polycarbonate-polyorganosiloxane copolymer having high transparency was obtained. The resultant polycarbonate-polyorganosiloxane copolymer had a viscosity-average molecular weight of 15,000, a polydimethylsiloxane content of 0.68 mass %, a total light transmittance of 69.7%, a haze value of 84.0, a hexane-extracted component amount of 55 ppm, and a ratio [POS-Mh]/[POS-M1] of 1.31.

Example 22

<Evaluation of Transparency of Raw Material Mixture after its Heating Treatment>

The transparency of a raw material mixture after its heating treatment was evaluated in the same manner as in Example 1 except that 19.7 g of the PDMS-1 was used as a polyorganosiloxane. The liquid raw material mixture after the heating treatment had high transparency, and had a total light transmittance of 99.2% and a haze value of 0.4.

<Production of PC-POS Copolymer>

Polymerization was performed under the same conditions as those of Example 1 except that 19.7 g of the PDMS-1 was used as a polyorganosiloxane. Thus, a pellet-shaped polycarbonate-polyorganosiloxane copolymer having high transparency was obtained. The resultant polycarbonate-polyorganosiloxane copolymer had a viscosity-average molecular weight of 15,600, a polydimethylsiloxane content of 0.43 mass %, a total light transmittance of 86.8%, a haze value of 3.9, a hexane-extracted component amount of 55 ppm, a ratio [POS-Mh]/[POS-M1] of 1.09, and a Charpy impact strength (with a notch) of 19.5 kJ/m$^2$.

Comparative Example 1

The transparency of a raw material mixture after its heating treatment was evaluated in the same manner as in Example 2 except that 24.4 g of the PDMS-5 was used as a polyorganosiloxane. The liquid raw material mixture after the heating treatment was cloudy, and had a total light transmittance of 78.5% and a haze value of 93.2.

Polymerization was performed under the same conditions as those of Example 2 except that 24.4 g of the PDMS-5 was used as a polyorganosiloxane. Thus, a pellet-shaped polycarbonate-polyorganosiloxane copolymer that was strongly cloudy was obtained. The results of the evaluations of the resultant polycarbonate-polyorganosiloxane copolymer are shown in Table 3.

Comparative Example 2

The transparency of a raw material mixture after its heating treatment was evaluated in the same manner as in Example 3 except that 20.2 g of the PDMS-5 was used as a polyorganosiloxane. The liquid raw material mixture after the heating treatment was cloudy, and had a total light transmittance of 79.1% and a haze value of 92.1.

Polymerization was performed under the same conditions as those of Example 3 except that 20.2 g of the PDMS-5 was used as a polyorganosiloxane. Thus, a pellet-shaped polycarbonate-polyorganosiloxane copolymer that was strongly cloudy was obtained. The results of the evaluations of the resultant polycarbonate-polyorganosiloxane copolymer are shown in Table 3.

Comparative Example 3

The transparency of a raw material mixture after its heating treatment was evaluated in the same manner as in Example 3 except that 105.4 g of the PDMS-5 was used as a polyorganosiloxane. The liquid raw material mixture after the heating treatment was cloudy, and had a total light transmittance of 63.2% and a haze value of 95.5.

Polymerization was performed under the same conditions as those of Example 3 except that 105.4 g of the PDMS-5 was used as a polyorganosiloxane. Thus, a pellet-shaped polycarbonate-polyorganosiloxane copolymer that was strongly cloudy was obtained. The results of the evaluations of the resultant polycarbonate-polyorganosiloxane copolymer are shown in Table 3.

Comparative Example 4

The transparency of a raw material mixture after its heating treatment was evaluated in the same manner as in Example 3 except that 20.2 g of the PDMS-6 was used as a polyorganosiloxane. The liquid raw material mixture after the heating treatment was cloudy, and had a total light transmittance of 79.5% and a haze value of 93.1.

Polymerization was performed under the same conditions as those of Example 3 except that 20.2 g of the PDMS-6 was used as a polyorganosiloxane. Thus, a pellet-shaped polycarbonate-polyorganosiloxane copolymer that was strongly cloudy was obtained. The results of the evaluations of the resultant polycarbonate-polyorganosiloxane copolymer are shown in Table 3.

Comparative Example 5

The transparency of a raw material mixture after its heating treatment was evaluated in the same manner as in Example 3 except that 20.2 g of the PDMS-7 was used as a polyorganosiloxane. The liquid raw material mixture after the heating treatment was cloudy, and had a total light transmittance of 81.1% and a haze value of 88.9.

Polymerization was performed under the same conditions as those of Example 3 except that 20.2 g of the PDMS-7 was used as a polyorganosiloxane. Thus, a pellet-shaped polycarbonate-polyorganosiloxane copolymer that was strongly cloudy was obtained. The results of the evaluations of the resultant polycarbonate-polyorganosiloxane copolymer are shown in Table 3.

Comparative Example 6

The transparency of a raw material mixture after its heating treatment was evaluated in the same manner as in Example 9 except that 22.1 g of the PDMS-5 was used as a polyorganosiloxane. The liquid raw material mixture after the heating treatment was cloudy, and had a total light transmittance of 80.1% and a haze value of 90.1.

Polymerization was performed under the same conditions as those of Example 9 except that 22.1 g of the PDMS-5 was used as a polyorganosiloxane. Thus, a pellet-shaped polycarbonate-polyorganosiloxane copolymer that was strongly cloudy was obtained. The results of the evaluations of the resultant polycarbonate-polyorganosiloxane copolymer are shown in Table 3.

Comparative Example 7

The transparency of a raw material mixture after its heating treatment was evaluated in the same manner as in Example 10 except that 19.8 g of the PDMS-5 was used as a polyorganosiloxane. The liquid raw material mixture after the heating treatment was cloudy, and had a total light transmittance of 78.5% and a haze value of 89.9.

Polymerization was performed under the same conditions as those of Example 10 except that 19.8 g of the PDMS-5 was used as a polyorganosiloxane. Thus, a pellet-shaped polycarbonate-polyorganosiloxane copolymer that was strongly cloudy was obtained. The results of the evaluations of the resultant polycarbonate-polyorganosiloxane copolymer are shown in Table 3.

Comparative Example 8

The transparency of a raw material mixture after its heating treatment was evaluated in the same manner as in Example 11 except that 21.3 g of the PDMS-5 was used as a polyorganosiloxane. The liquid raw material mixture after the heating treatment was cloudy, and had a total light transmittance of 79.9% and a haze value of 88.5.

Polymerization was performed under the same conditions as those of Example 11 except that 21.3 g of the PDMS-5 was used as a polyorganosiloxane. Thus, a pellet-shaped polycarbonate-polyorganosiloxane copolymer that was strongly cloudy was obtained. The results of the evaluations of the resultant polycarbonate-polyorganosiloxane copolymer are shown in Table 3.

Comparative Example 9

The transparency of a raw material mixture after its heating treatment was evaluated in the same manner as in Example 1 except that 19.8 g of the PDMS-5 was used as a polyorganosiloxane. The liquid raw material mixture after the heating treatment was cloudy, and had a total light transmittance of 78.1% and a haze value of 94.5.

Polymerization was performed under the same conditions as those of Example 1 except that 19.8 g of the PDMS-5 was used as a polyorganosiloxane. Thus, a pellet-shaped polycarbonate-polyorganosiloxane copolymer that was strongly cloudy was obtained. The resultant polycarbonate-polyorganosiloxane copolymer had a viscosity-average molecular weight of 15,100, a polydimethylsiloxane content of 0.62 mass %, a total light transmittance of 53.1%, a haze value of 98.5, a hexane-extracted component amount of 175 ppm, a ratio [POS-Mh]/[POS-M1] of 1.1, and a Charpy impact strength (with a notch) of 15.8 kJ/m$^2$.

Comparative Example 10

The transparency of a raw material mixture after its heating treatment was evaluated in the same manner as in Example 1 except that 179.7 g of the PDMS-5 was used as a polyorganosiloxane. The liquid raw material mixture after the heating treatment was cloudy, and had a total light transmittance of 65.1% and a haze value of 97.5.

Polymerization was performed under the same conditions as those of Example 1 except that 179.7 g of the PDMS-5 was used as a polyorganosiloxane. Thus, a pellet-shaped polycarbonate-polyorganosiloxane copolymer that was strongly cloudy was obtained. The resultant polycarbonate-polyorganosiloxane copolymer had a viscosity-average molecular weight of 20,000, a polydimethylsiloxane content of 5.30 mass %, a total light transmittance of 19.3%, a haze value of 99.6, a hexane-extracted component amount of 1,351 ppm, a ratio [POS-Mh]/[POS-M1] of 1.4, and a Charpy impact strength (with a notch) of 61.0 kJ/m$^2$.

Comparative Example 11

The transparency of a raw material mixture after its heating treatment was evaluated in the same manner as in Example 1 except that 179.7 g of the PDMS-7 was used as a polyorganosiloxane. The liquid raw material mixture after the heating treatment was cloudy, and had a total light transmittance of 66.5% and a haze value of 96.2.

Polymerization was performed under the same conditions as those of Example 1 except that 179.7 g of the PDMS-7 was used as a polyorganosiloxane. Thus, a pellet-shaped polycarbonate-polyorganosiloxane copolymer that was strongly cloudy was obtained. The resultant polycarbonate-polyorganosiloxane copolymer had a viscosity-average molecular weight of 20,100, a polydimethylsiloxane content of 5.50 mass %, a total light transmittance of 17.5%, a haze value of 99.5, a hexane-extracted component amount of 1,416 ppm, a ratio [POS-Mh]/[POS-M1] of 1.3, and a Charpy impact strength (with a notch) of 61.0 kJ/m$^2$.

TABLE 2

| | | | | Example | | | | | | | | | | |
|---|---|---|---|---|---|---|---|---|---|---|---|---|---|---|
| | | | Unit | 1 | 2 | 3 | 4 | 5 | 6 | 7 | 8 | 9 | 10 | 11 |
| Loading condition | Diol monomer (A) | BisP-A | Molar ratio | 100 | 50 | | | | | | | | | |
| | | ISB | | | | 70 | 70 | 70 | 70 | 70 | 70 | 70 | 70 | 70 |
| | | 1,4-CHDM | | | 50 | 30 | 30 | 30 | 30 | 30 | 30 | | 25 | 28 |
| | | TCDDM | | | | | | | | | | 30 | | |
| | | 1,3-PG | | | | | | | | | | | 5 | |
| | | PEG 400 | | | | | | | | | | | | 2 |
| | Carbonic acid diester | DPC | | 107 | 103 | 100 | 100 | 100 | 100 | 100 | 100 | 100 | 100 | 100 |
| | Polyorgano- | PDMS-1 | wt %* | 1 | 1 | 1 | | | 5 | 10 | 1 | 1 | 1 | |

TABLE 2-continued

|  |  |  | Unit | Example | | | | | | | | | | |
|---|---|---|---|---|---|---|---|---|---|---|---|---|---|---|
|  |  |  |  | 1 | 2 | 3 | 4 | 5 | 6 | 7 | 8 | 9 | 10 | 11 |
|  | siloxane (B) | PDMS-2 |  |  |  |  | 1 |  |  |  |  |  |  |  |
|  |  | PDMS-3 |  |  |  |  |  | 1 |  |  |  |  |  |  |
|  |  | PDMS-4 |  |  |  |  |  |  | 1 |  |  |  |  |  |
|  |  | PDMS-5 |  |  |  |  |  |  |  |  |  |  |  |  |
|  |  | PDMS-6 |  |  |  |  |  |  |  |  |  |  |  |  |
|  |  | PDMS-7 |  |  |  |  |  |  |  |  |  |  |  |  |
| Evaluation result | Raw material mixture after its heating treatment | Total light transmittance | % | 98.4 | 98.5 | 99.5 | 98.4 | 98.1 | 97.9 | 97.5 | 97.1 | 98.5 | 98.3 | 98.3 |
|  |  | Haze value | — | 0.5 | 0.5 | 0.4 | 0.8 | 1.3 | 0.7 | 0.9 | 1.1 | 0.4 | 0.4 | 0.4 |
|  | PC-POS copolymer | Polyorganosiloxane represented by formula (1) | wt % | 0.62 | 0.63 | 0.62 | 0.73 | 0.82 | 0.67 | 3.3 | 6.3 | 0.61 | 0.62 | 0.62 |
|  |  | Viscosity-average molecular weight | Mv | 15,500 | 15,100 | 14,900 | 15,100 | 15,100 | 14,500 | 15,400 | 15,300 | 15,100 | 14,800 | 14,900 |
|  |  | Total light transmittance (1 mmt) | % | 82.0 | 84.0 | 91.1 | 86.5 | 80.1 | 90.2 | 90.5 | 88.9 | 90.8 | 91.2 | 90.9 |
|  |  | Haze value | — | 5.5 | 4.1 | 0.7 | 3.1 | 5.8 | 1.3 | 1.9 | 3.6 | 0.7 | 0.9 | 0.9 |
|  |  | Hexane-extracted component amount | ppm | 57 | 56 | 53 | 54 | 57 | 51 | 58 | 65 | 52 | 53 | 52 |
|  |  | [POS-Mh]/[POS-Ml] | — | 1.09 | 1.15 | 1.16 | 1.04 | 1.01 | 1.15 | 1.22 | 1.35 | 1.17 | 1.15 | 1.14 |
|  |  | Charpy impact strength (with a notch) | $kJ/m^2$ | 20.3 | 22.4 | 9.8 | 10.8 | 12.1 | 8.7 | 12.5 | 14.5 | 8.9 | 10.5 | 10.8 |

*The wt % of the polyorganosiloxane (B) represents the amount of the loaded polyorganosiloxane (B) in the mass (theoretical value) of the PC-POS copolymer to be obtained. The numerical value was determined from the following equation.
Mass (theoretical value) of PC-POS copolymer = mass of all diol monomers + mass of carbonic acid diester + mass of polyorganosiloxane (B)-mass of produced phenol phenol whose molar amount is twice as large as that of the carbonic acid diester)

TABLE 3

|  |  |  | Unit | Comparative Example | | | | | | | |
|---|---|---|---|---|---|---|---|---|---|---|---|
|  |  |  |  | 1 | 2 | 3 | 4 | 5 | 6 | 7 | 8 |
| Loading condition | Dial monomer (A) | BisP-A | Molar ratio | 50 |  |  |  |  |  |  |  |
|  |  | ISB |  |  | 70 | 70 | 70 | 70 | 70 | 70 | 70 |
|  |  | 1,4-CHDM |  | 50 | 30 | 30 | 30 | 30 |  | 25 | 28 |
|  |  | TCDDM |  |  |  |  |  |  | 30 |  |  |
|  |  | 1,3-PG |  |  |  |  |  |  |  | 5 |  |
|  |  | PEG 400 |  |  |  |  |  |  |  |  | 2 |
|  | Carbonic acid diester | DPC |  | 103 | 100 | 100 | 100 | 100 | 100 | 100 | 100 |
|  | Polyorganosiloxane (B) | PDMS-1 |  |  |  |  |  |  |  |  |  |
|  |  | PDMS-2 |  |  |  |  |  |  |  |  |  |
|  |  | PDMS-3 |  |  |  |  |  |  |  |  |  |
|  |  | PDMS-4 | wt %* |  |  |  |  |  |  |  |  |
|  |  | PDMS-5 |  |  | 1 | 1 | 5 |  |  | 1 | 1 | 1 |
|  |  | PDMS-6 |  |  |  |  |  | 1 |  |  |  |
|  |  | PDMS-7 |  |  |  |  |  |  | 1 |  |  |
| Evaluation result | Raw material mixture after its heating treatment | Total light transmittance | % | 78.5 | 79.1 | 63.2 | 79.5 | 81.1 | 80.1 | 78.5 | 79.9 |
|  |  | Haze value | — | 93.2 | 92.1 | 95.5 | 93.1 | 88.9 | 90.1 | 89.9 | 88.5 |
|  | PC-POS copolymer | Polyorganosiloxane represented by formula (1) | wt % | 0.87 | 0.88 | 4.01 | 0.87 | 0.89 | 0.86 | 0.87 | 0.88 |
|  |  | Viscosity-average molecular weight | Mv | 15,100 | 15,300 | 15,100 | 15,300 | 14,900 | 14,900 | 15,100 | 15,000 |
|  |  | Total light transmittance (1 mmt) | % | 51.1 | 52.7 | 41.0 | 51.2 | 50.1 | 51.6 | 49.9 | 53.1 |
|  |  | Haze value | — |  | 99.3 | 99.6 | 99.8 | 98.2 | 98.5 | 99.2 | 98.2 | 97.5 |

TABLE 3-continued

| | | Comparative Example | | | | | | | |
|---|---|---|---|---|---|---|---|---|---|
| | Unit | 1 | 2 | 3 | 4 | 5 | 6 | 7 | 8 |
| Hexane-extracted component amount | ppm | 178 | 166 | 341 | 167 | 171 | 168 | 166 | 171 |
| [POS-Mh]/[POS-Ml] | — | 0.20 | 0.25 | 0.17 | 0.21 | 0.25 | 0.22 | 0.23 | 0.25 |
| Charpy impact strength (with a notch) | kJ/m² | 14.2 | 6.1 | 6.8 | 6.2 | 6.0 | 6.3 | 6.3 | 6.4 |

*The wt % of the polyorganosiloxane (B) represents the amount of the loaded polyorganosiloxane (B in the mass (theoretical value of the PC-POS copolymer to be obtained. The numerical value was determined from the following equation.
Mass (theoretical value) of PC-POS copolymer = mass of all diol monomers + mass of carbonic acid diester + mass of polyorganosiloxane (B)-mass of produced phenol (phenol whose molar amount is twice as large as that of the carbonic acid diester)

The invention claimed is:

1. A polycarbonate-polyorganosiloxane copolymer, comprising:
a polyorganosiloxane block (A-1) including a structural unit represented by the following formula (1'); and
a polycarbonate block (A-2) formed of a repeating unit represented by the following formula (2),
wherein the polycarbonate-polyorganosiloxane copolymer satisfies the following condition (A) or (B):
condition (A): a hexane extraction amount of the polycarbonate-polyorganosiloxane copolymer is 150 ppm by mass or less; and
condition (B): average weights of polyorganosiloxane blocks in polycarbonate-polyorganosiloxane copolymers obtained by separating the polycarbonate-polyorganosiloxane copolymer with a gel permeation chromatograph satisfy the following expression (B1):

0.3≤[POS-Mh]/[POS-Ml]≤3   (B1)

wherein
in the expression (B1), [POS-Mh] represents a weight fraction of a polyorganosiloxane block in a polycarbonate-polyorganosiloxane copolymer obtained by fractionating a component corresponding to a retention time range of from T1 to T2 with the gel permeation chromatograph, and [POS-Ml] represents a weight fraction of a polyorganosiloxane block in a polycarbonate-polyorganosiloxane copolymer obtained by fractionating a component corresponding to a retention time range of from T2 to T3 with the gel permeation chromatograph:
T1: a retention time at which a peak top in a gel permeation chromatogram of a standard polystyrene having a ratio Mw/Mn of 1.01 and a Mw of 98,900 is positioned;
T2: a retention time at which a peak top in a gel permeation chromatogram of a standard polystyrene having a ratio Mw/Mn of 1.01 and a Mw of 13,700 is positioned; and
T3: a retention time at which a peak top in a gel permeation chromatogram of a standard polystyrene having a ratio Mw/Mn of 1.03 and a Mw of 3,120 is positioned:

wherein $R^1$ to $R^4$ may be identical to or different from each other, and each independently represent a hydrogen atom, a halogen atom, an alkyl group having 1 to 10 carbon atoms, an alkoxy group having 1 to 10 carbon atoms, an aryl group having 6 to 12 carbon atoms, or an alkylaryl group whose alkyl group moiety has 1 to 10 carbon atoms, $R^6$ represents an arylene group having 6 to 20 carbon atoms, an alkylene group having 1 to 10 carbon atoms, or an alkylarylene group whose alkyl group moiety has 1 to 10 carbon atoms, and may contain, as a functional group, —O—, —COO—, —CO—, —S—, —NH—, or —NR$^{111}$—, a plurality of $R^8$ may be identical to or different from each other, and each independently represent an arylene group having 6 to 20 carbon atoms, an alkylene group having 2 to 10 carbon atoms, a branched alkylene group having 3 to 10 carbon atoms, or an alkylarylene group whose alkyl group moiety has 1 to 10 carbon atoms, and may each contain, as a functional group, —O—, —COO—, —CO—, —S—, —NH—, or —NR$^{111}$, $R^{111}$ represents an alkyl group having 1 to 10 carbon atoms or an aryl group having 6 to 10 carbon atoms, "z" represents 1, "a" represents an integer of from 2 to 500, "b" represents an integer of from 2 to 200, $R^{10}$ represents a divalent aliphatic hydrocarbon group having 2 to 40 carbon atoms or a divalent alicyclic hydrocarbon group having 3 to 40 carbon atoms, or a divalent aromatic hydrocarbon group having 6 to 20 carbon atoms, and may be substituted with a substituent, the divalent aliphatic hydrocarbon group, the divalent alicyclic hydrocarbon group, or the divalent aromatic hydrocarbon group may contain at least one heteroatom selected from an oxygen atom, a nitrogen atom, and a sulfur atom, or at least one halogen atom selected from a fluorine atom, a chlorine atom, a bromine atom, and an iodine atom, and "y" represents an integer of from 10 to 500.

2. The polycarbonate-polyorganosiloxane copolymer according to claim 1, wherein the polycarbonate block (A-2) has a structure represented by the following formula (111) and a structure represented by the following formula (112):

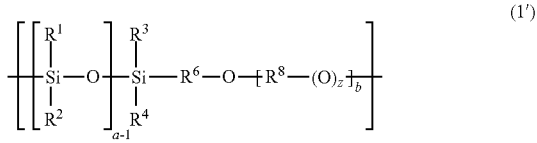

(1')

(2)

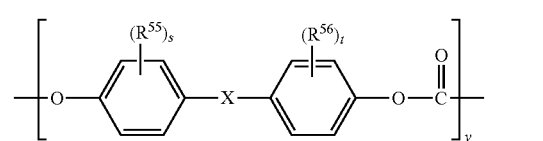

(111)

(112)

where $R^{55}$ and $R^{56}$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^{100}$ represents a divalent aliphatic hydrocarbon group having 2 to 40 carbon atoms, and may include a branched structure or a cyclic structure, and $R^{100}$ may contain at least one heteroatom selected from an oxygen atom, a nitrogen atom, and a sulfur atom, or at least one halogen atom selected from a fluorine atom, a chlorine atom, a bromine atom, and an iodine atom, "y" represents an integer of from 10 to 500, and "s" and "t" each independently represent an integer of from 0 to 4.

3. The polycarbonate-polyorganosiloxane copolymer according to claim 1, wherein the polycarbonate block (A-2) represented by the formula (2) includes one of a structural unit derived from an aromatic bisphenol selected from the group consisting of 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3-methylcyclohexane, 1,1-bis(4-hydroxyphenyl)-3,3,5-trimethylcyclohexane, and 1,1-bis(4-hydroxyphenyl)cyclododecene, and a structural unit derived from an aliphatic diol selected from the group consisting of isosorbide, cyclohexane-1,4-dimethanol, tricyclodecanedimethanol, 3,9-bis(1,1-dimethyl-2-hydroxyethyl)-2,4,8,10-tetraoxaspiro[5.5]undecane, 1,3-propanediol, and 1,4-butanediol.

4. The polycarbonate-polyorganosiloxane copolymer according to claim 1, wherein the polycarbonate block (A-2) includes one or more selected from the group consisting of repeating units represented by the following formulae (a-i) to (a-v).

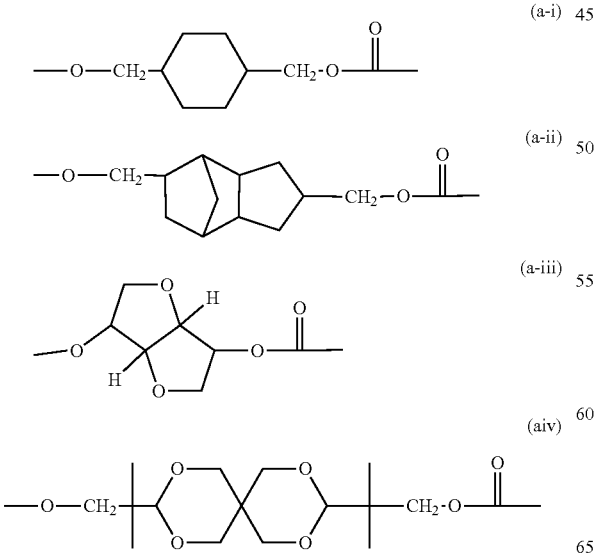
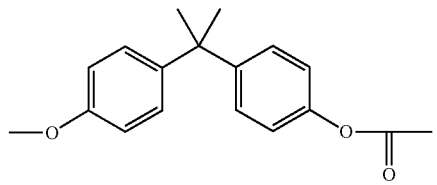

5. The polycarbonate-polyorganosiloxane copolymer according to claim 1, wherein in the formula (1), "a" represents an integer of 2 or more and 300 or less.

6. A polycarbonate-polyorganosiloxane copolymer, comprising:
a polyorganosiloxane block (A-1) including at least one selected from the group consisting of structural units represented by the following formulae (1-1) to (1-3); and
a polycarbonate block (A-2) formed of a repeating unit represented by the following formula (2),
wherein the polycarbonate-polyorganosiloxane copolymer satisfies the following condition (A) or (B):
condition (A): a hexane extraction amount of the polycarbonate-polyorganosiloxane copolymer is 150 ppm by mass or less; and
condition (B): average weights of polyorganosiloxane blocks in polycarbonate-polyorganosiloxane copolymers obtained by separating the polycarbonate-polyorganosiloxane copolymer with a gel permeation chromatograph satisfy the following expression (B1):

$$0.3 \leq [\text{POS-Mh}]/[\text{POS-M1}] \leq 3 \tag{B1}$$

wherein
in the expression (B1), [POS-Mh] represents a weight fraction of a polyorganosiloxane block in a polycarbonate-polyorganosiloxane copolymer obtained by fractionating a component corresponding to a retention time range of from T1 to T2 with the gel permeation chromatograph, and [POS-M1] represents a weight fraction of a polyorganosiloxane block in a polycarbonate-polyorganosiloxane copolymer obtained by fractionating a component corresponding to a retention time range of from T2 to T3 with the gel permeation chromatograph:
T1: a retention time at which a peak top in a gel permeation chromatogram of a standard polystyrene having a ratio Mw/Mn of 1.01 and a Mw of 98,900 is positioned;
T2: a retention time at which a peak top in a gel permeation chromatogram of a standard polystyrene having a ratio Mw/Mn of 1.01 and a Mw of 13,700 is positioned; and
T3: a retention time at which a peak top in a gel permeation chromatogram of a standard polystyrene having a ratio Mw/Mn of 1.03 and a Mw of 3,120 is positioned;

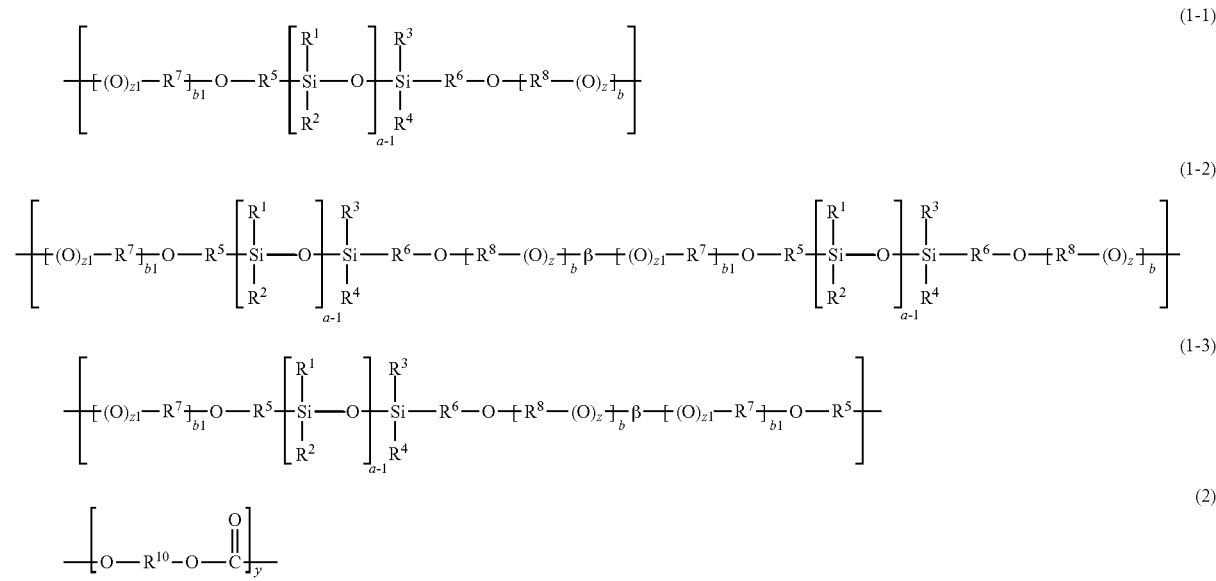

wherein $R^1$ to $R^4$ may be identical to or different from each other, and each independently represent a hydrogen atom, a halogen atom, an alkyl group having 1 to 10 carbon atoms, an alkoxy group having 1 to 10 carbon atoms, an aryl group having 6 to 12 carbon atoms, or an alkylaryl group whose alkyl group moiety has 1 to 10 carbon atoms, $R^6$ represents an arylene group having 6 to 20 carbon atoms, an alkylene group having 1 to 10 carbon atoms, or an alkylarylene group whose alkyl group moiety has 1 to 10 carbon atoms, and may contain, as a functional group, —O—, —COO—, —CO—, —S—, —NH—, or —NR$^{111}$—, a plurality of $R^8$s may be identical to or different from each other, and each independently represent an arylene group having 6 to 20 carbon atoms, an alkylene group having 2 to 10 carbon atoms, a branched alkylene group having 3 to 10 carbon atoms, or an alkylarylene group whose alkyl group moiety has 1 to 10 carbon atoms, and may each contain, as a functional group, —O—, —COO—, —CO—, —S—, —NH—, or —NR$^{111}$—, $R^{111}$ represents an alkyl group having 1 to 10 carbon atoms or an aryl group having 6 to 10 carbon atoms, "z" represents 1, "a" represents an integer of from 2 to 500, "b" represents an integer of from 2 to 200, $R^5$ represents an arylene group having 6 to 20 carbon atoms, an alkylene group having 1 to 10 carbon atoms, or an alkylarylene group whose alkyl group moiety has 1 to 10 carbon atoms, and may contain, as a functional group, —O—, —COO—, —CO—, —S—, —NH—, or —NR$^{111}$—, $R^7$ represents an arylene group having 6 to 20 carbon atoms, an alkylene group having 2 to 10 carbon atoms, a branched alkylene group having 3 to 10 carbon atoms, or an alkylarylene group whose alkyl group moiety has 1 to 10 carbon atoms, and may contain, as a functional group, —O—, —COO—, —CO—, —S—, —NH—, or —NR$^{111}$—, $R^{111}$ represents an alkyl group having 1 to 10 carbon atoms or an aryl group having 6 to 10 carbon atoms, "z1" represents 0 or 1, "b1" represents an integer of from 2 to 200, and β represents a divalent group derived from a diisocyanate compound, or a divalent group derived from a dicarboxylic acid or a dicarboxylic acid halide, and $R^{10}$ represents a divalent aliphatic hydrocarbon group having 2 to 40 carbon atoms or a divalent alicyclic hydrocarbon group having 3 to 40 carbon atoms, or a divalent aromatic hydrocarbon group having 6 to 20 carbon atoms, and may be substituted with a substituent, the divalent aliphatic hydrocarbon group, the divalent alicyclic hydrocarbon group, or the divalent aromatic hydrocarbon group may contain at least one heteroatom selected from an oxygen atom, a nitrogen atom, and a sulfur atom, or at least one halogen atom selected from a fluorine atom, a chlorine atom, a bromine atom, and an iodine atom, and "y" represents an integer of from 10 to 500.

7. The polycarbonate-polyorganosiloxane copolymer according to claim 1, wherein in the formula (1), $R^1$ to $R^4$ each represent a methyl group.

8. The polycarbonate-polyorganosiloxane copolymer according to claim 1, wherein in the formula (1), $R^6$ represents a trimethylene group (—(CH$_2$)$_3$—).

9. The polycarbonate-polyorganosiloxane copolymer according to claim 1, wherein in the formula (1'), $R^8$ represents any structure selected from the group consisting of a dimethylene group (—(CH$_2$)$_2$—), a methyl-substituted dimethylene group (—CH$_2$CHMe-), a trimethylene group (—(CH$_2$)$_3$—), and a tetramethylene group (—(CH$_2$)$_4$—).

10. The polycarbonate-polyorganosiloxane copolymer according to claim 1, wherein a content of the polyorganosiloxane block represented by the formula (1) in the polycarbonate-polyorganosiloxane copolymer is 0.1 mass % or more and 60 mass % or less.

11. The polycarbonate-polyorganosiloxane copolymer according to claim 1, wherein the polycarbonate-polyorganosiloxane copolymer has a viscosity-average molecular weight (Mv) of 5,000 or more and 50,000 or less.

12. The polycarbonate-polyorganosiloxane copolymer according to claim 1, wherein a 1-millimeter thick plate obtained by molding the polycarbonate-polyorganosiloxane copolymer has a haze value of 40 or less measured in conformity with ISO 14782:1999.

13. The polycarbonate-polyorganosiloxane copolymer according to claim 1, wherein the polycarbonate-polyorganosiloxane copolymer is obtained by a melt polymerization method.

14. The polycarbonate-polyorganosiloxane copolymer according to claim 1, wherein the polycarbonate-polyorganosiloxane copolymer is obtained by using a diol monomer (a1).

15. A polycarbonate-based resin composition, comprising the polycarbonate-polyorganosiloxane copolymer of claim 1.

16. The polycarbonate-based resin composition according to claim 15, further comprising an inorganic filler.

17. The polycarbonate-based resin composition according to claim 16, wherein the polycarbonate-based resin composition comprises 1 part by mass to 150 parts by mass of the inorganic filler with respect to 100 parts by mass of the polycarbonate-polyorganosiloxane copolymer.

18. The polycarbonate-based resin composition according to claim 16, wherein the inorganic filler is one of a glass fiber and a carbon fiber.

19. A molded body, comprising the polycarbonate-based resin composition of claim 15.

\* \* \* \* \*